(12) United States Patent
Zeidan et al.

(10) Patent No.: US 10,243,678 B2
(45) Date of Patent: Mar. 26, 2019

(54) LINEARIZATION OF RADIO FREQUENCY TRANSCEIVERS AND TEST SYSTEMS THROUGH DYNAMIC EXTRACTION OF COMPLEX NONLINEAR MODELS THEREOF

(71) Applicant: NATIONAL INSTRUMENTS CORPORATION, Austin, TX (US)

(72) Inventors: Mohamad A. Zeidan, Austin, TX (US); Christopher J. Behnke, Austin, TX (US); Syed Jaffar Shah, Austin, TX (US)

(73) Assignee: National Instruments Corporation, Austin, TX (US)

( * ) Notice: Subject to any disclaimer, the term of this patent is extended or adjusted under 35 U.S.C. 154(b) by 291 days.

(21) Appl. No.: 14/328,898

(22) Filed: Jul. 11, 2014

(65) Prior Publication Data

US 2015/0118971 A1 Apr. 30, 2015

Related U.S. Application Data

(60) Provisional application No. 61/896,380, filed on Oct. 28, 2013.

(51) Int. Cl.
*H04B 17/00* (2015.01)
(52) U.S. Cl.
CPC .................. *H04B 17/0087* (2013.01)
(58) Field of Classification Search
CPC .................. H04B 17/14; H04B 17/19
USPC .......................................................... 455/67.11
See application file for complete search history.

(56) References Cited

U.S. PATENT DOCUMENTS

| | | |
|---|---|---|
| 5,715,372 A | 2/1998 | Meyers |
| 6,151,559 A | 11/2000 | Williams |
| 6,381,269 B1 | 4/2002 | Gradl |
| 6,487,417 B1 | 11/2002 | Rossoni |
| 7,250,772 B2 | 7/2007 | Furse |
| 7,273,978 B2 | 9/2007 | Uhle |
| 7,282,926 B1 | 10/2007 | Verspecht |

(Continued)

*Primary Examiner* — Wen W Huang
(74) *Attorney, Agent, or Firm* — Meyertons Hood Kivlin Kowert and Goetzel PC; Jeffrey C. Hood

(57) ABSTRACT

Dynamic characterization of complex high-order nonlinearity in transmitter (TX) and receiver (RX) signal chains of transceiver systems can be efficiently and accurately performed. A loopback connection may be used to facilitate self-characterization. Appropriate RX and TX configuration settings may be developed to facilitate de-coupling of individual RX and TX nonlinearities from measured cascade nonlinearity. The system's high-order response to a two-tone signal generation may be measured, and complex mathematical analysis may be performed to identify and isolate passband nonlinear components to extract a high-order memory-less model for the system. The extracted system model may be used in the corrective and non-iterative pre-distortion of generated signals and in the post-distortion of received signals to improve linearity performance of the transceiver. The memory-less model and the analytical system are effective in improving performance of class-A-amplifier-based signal chains that are common in test and measurement systems and channel emulation systems.

17 Claims, 9 Drawing Sheets

(56) References Cited

U.S. PATENT DOCUMENTS

| | | | |
|---|---|---|---|
| 7,460,323 B2 | 12/2008 | Lee | |
| 7,552,154 B2 | 6/2009 | Moriya | |
| 8,255,183 B1* | 8/2012 | Husted | H04B 17/0085 702/117 |
| 8,285,764 B2 | 10/2012 | Moriya | |
| 8,498,591 B1* | 7/2013 | Qian | H04B 1/0475 375/297 |
| 8,917,803 B1 | 12/2014 | Asuncion | |
| 2008/0212725 A1* | 9/2008 | Tang | H04W 72/02 375/346 |
| 2009/0227214 A1* | 9/2009 | Georgantas | H04B 1/30 455/86 |
| 2012/0149412 A1* | 6/2012 | Nergis | H04B 1/525 455/501 |
| 2012/0196546 A1* | 8/2012 | Ly-Gagnon | H03F 3/24 455/73 |
| 2013/0084852 A1* | 4/2013 | Duperray | H04B 17/0027 455/425 |
| 2013/0138416 A1* | 5/2013 | Verspecht | H03F 1/3247 703/13 |
| 2013/0222059 A1* | 8/2013 | Kilambi | H04B 1/0475 330/149 |
| 2014/0192922 A1* | 7/2014 | Wyville | H04B 1/04 375/296 |

\* cited by examiner

LINEARIZATION OF RADIO FREQUENCY TRANSCEIVERS AND TEST SYSTEMS THROUGH DYNAMIC EXTRACTION OF COMPLEX NONLINEAR MODELS THEREOF

PRIORITY INFORMATION

This application claims priority to U.S. Provisional Patent Application No. 61/896,380 filed on Oct. 28, 2013 and titled "Linearization of Radio Frequency Transceivers and Test Systems Through Dynamic Extraction of Complex Nonlinear Models Thereof", which is hereby incorporated in its entirety as though fully and completely set forth herein.

FIELD OF THE INVENTION

The present invention relates to the field of instrumentation, and more particularly to characterizing and improving the performance of transceivers and test systems.

DESCRIPTION OF THE RELATED ART

In many industrial applications (and others), instruments collect data or information from an environment or unit under test (UUT), and may also analyze and process acquired data. Some instruments provide test stimuli to a UUT. Examples of instruments include oscilloscopes, digital multimeters, pressure sensors, arbitrary waveform generators, digital waveform generators, etc. The information that may be collected by respective instruments includes information describing voltage, resistance, distance, velocity, pressure, oscillation frequency, humidity, and/or temperature, among others. Computer-based instrumentation systems typically include transducers for capturing a physical phenomenon and generating a representative electrical signal, signal conditioning logic to perform amplification on the electrical signal, isolation, and/or filtering, and analog-to-digital (A/D) conversion logic for receiving analog signals and providing corresponding digital signals to the host computer system.

In a computer-based system, the instrumentation hardware or device is typically an expansion board plugged into one of the I/O slots of the computer system. In another common instrumentation system configuration, the instrumentation hardware is coupled to the computer system via other means such as through a VXI (VME extensions for Instrumentation) bus, a GPIB (General Purpose Interface Bus), a PXI (PCI extensions for Instrumentation) bus, Ethernet, a serial port or bus, or parallel port of the computer system. The instrumentation hardware may include a DAQ (Data Acquisition) board, a computer-based instrument such as a multimeter, or another type of instrumentation device. In another common system configuration, a chassis and boards inserted in the chassis may operate as a standalone instrument or instrument suite, although in some cases a host computer may be used to configure or program the boards prior to, or during operation.

The instrumentation hardware may be configured and controlled by software executing on a host computer system coupled to the system, or by a controller card installed in the chassis. The software for configuring and controlling the instrumentation system typically includes driver software and the instrumentation application software, or the application. The driver software serves to interface the instrumentation hardware to the application and is typically supplied by the manufacturer of the instrumentation hardware or by a third party software vendor. The application is typically developed by the user of the instrumentation system and is tailored to the particular function that the user intends the instrumentation system to perform. The instrumentation hardware manufacturer or third party software vendor sometimes supplies application software for applications that are common, generic, or straightforward. Instrumentation driver software provides a high-level interface to the operations of the instrumentation device. The instrumentation driver software may operate to configure the instrumentation device for communication with the host system and to initialize hardware and software to a known state. The instrumentation driver software may also maintain a soft copy of the state of the instrument and initiated operations. Further, the instrumentation driver software communicates over the bus to move the device from state to state and to respond to device requests.

Among the many instrumentation solutions, software-defined RF (radio frequency) test system architectures have become increasingly popular over the past several decades. Almost every commercial off-the-shelf (COTS) automated RF test system today uses application software to communicate through a bus interface to the instrument. As RF applications become more complex, engineers are continuously challenged with the dilemma of increasing functionality without increasing test times, and ultimately test cost. While improvements in test measurement algorithms, bus speeds, and CPU speeds have reduced test times, the continued increase in the complexity of RF test applications provides additional challenges.

To address the need for speed and flexibility, COTS RF test instruments have increased their use of field-programmable gate arrays (FPGAs). At a high level, FPGAs are reprogrammable silicon chips that can be configured to implement custom hardware functionality through software development environments. While FPGAs in RF instrumentation provide effective solutions, FPGAs are typically designed for specific purposes and allow little customization. Consequently, user-programmable FPGAs have a significant advantage over closed, fixed-purpose FPGAs. With user-programmable FPGAs, RF instruments may be customized to target specific application needs.

A vector signal transceiver (VST) is a new class of instrumentation that combines a vector signal generator (VSG) and vector signal analyzer (VSA) with FPGA-based real-time signal processing and control. One class of VSTs also features a user-programmable FPGA, which allows custom algorithms to be implemented directly into the hardware design of the instrument. This software-designed approach allows a VST to have the flexibility of software-defined radio (SDR) architecture with RF instrument class performance. Digital pre-distortion has been used to compensate for and improve transmit (TX) signal chains. The process traditionally involves either characterization of the device and/or signal chain, or special hardware that includes the pre-distortion design, and which continuously "monitors" the output.

In a VST, pre-distortion may be performed on the transmitted signal, or post-distortion may be performed on the received signal to compensate for the nonlinear distortion induced by the TX or RX signal chains, respectively. This normally entails either separate special characterization of the signal chains where nonlinearity compensation can be saved as calibration factors for later use, or the addition of specially-designed circuitry in each of the signal chains to help with the pre-distortion design. Most linearization schemes in use today cover inherently nonlinear amplifiers, such as switching amplifiers used in base stations for efficient high power transmission, class F amplifiers, or Doherty, class AB, class C, or other non-class A amplifiers. More recently, the demand for high linearity performance for WLAN (Wide Local Area Network) applications resulted in the common use of amplifiers whose efficiency is below 10%. This, in addition to digital pre-distortion (DPD) becoming more affordable, lead researchers to consider DPD for linear class A amplifiers, either to further improve linearity or as means to gain some efficiency while maintaining an acceptable linearity performance. It would therefore be desirable to provide characterization methods that don't require additional circuitry and/or special calibration steps to characterize transceiver systems.

Other corresponding issues related to the prior art will become apparent to one skilled in the art after comparing such prior art with the present invention as described herein.

SUMMARY OF THE INVENTION

Additional circuitry and/or special calibration steps during testing of a transceiver system may be avoided by using existing operating capabilities of the instrument being tested and/or characterized. For example, capabilities of a VST (Vector Signal Transceiver) may be used to self-characterize RX (receive) and TX (transmit) nonlinearities separately, e.g. as part of a self-calibration routine or a special step to be performed prior to performing actual measurements, and compensate for those nonlinearities during measurements.

More generally, dynamic characterization of complex high-order nonlinearity in TX and RX signal chains, or signal paths of transceiver systems may be performed. A loopback connection may be utilized to facilitate self-characterization. Appropriate RX and TX configuration settings may be developed and used to enable the decoupling of individual RX and TX nonlinearities from the measured cascade nonlinearity. The system's high-order response to a two-tone signal generation may be measured, and relying on complex mathematical analysis that identifies and isolates passband nonlinear components, a complex high-order memory-less model for the system may be extracted. The extracted system model may then be used in the corrective and non-iterative pre-distortion of generated signals and in the post-distortion of received signals, to improve linearity performance of the transceiver. The memory-less model and the analytical system are effective in improving performance of class-A-amplifier-based signal chains that are common in test and measurement and/or channel emulation systems.

Accordingly, a method may be implemented for obtaining a complex high-order nonlinear model of a transmit (TX) signal chain (signal path) or receive (RX) signal chain (signal path) of a radio frequency (RF) transceiver or test system. The obtained complex high-order nonlinear model may be used in linearizing the signal chain. The method may include configuring a receive signal chain of the transceiver to high-linearity setting for characterizing transmit nonlinearity, and generating, by the TX signal chain, a two-tone signal at a desired level at specific TX signal chain settings. The method further includes acquiring, by the RX signal chain, the generated two-tone signal, and extracting, by a processing unit, a complex high-order nonlinearity representative of the TX signal chain by having the processing unit analyze the acquired two-tone signal according to a specified algorithm. An RX signal chain may be characterized in a similar manner by using linear or linearized TX signal chain settings and RX signal chain settings targeted for characterization and linearization.

A system may be devised for obtaining a complex high order nonlinear model of a transmit (TX) signal chain or receive (RX) signal chain of a radio frequency (RF) transceiver or test system. When characterizing the TX signal chain, the RX signal chain may first be configured to operate in a high linearity mode. That is, the RX signal chain may be configured to provide high linearity, or operate in a highly linear manner, in order for the RX signal chain not to introduce its own nonlinearity when characterizing TX signal chain nonlinearity. Accordingly, the TX signal chain may be adjusted to operate according to specified settings, that is, the TX signal chain may be configured with desired specified settings. The thus configured TX signal chain may then be operated to generate a test signal intended to be a two-tone signal at a desired level. While the test signal may be based on a digital baseband signal having two different tones, the test signal (i.e. the RF signal ultimately output by the TX chain) may contain intermodulation distortion (IMD) components of one or more specified orders, caused by nonlinearity present in the entire TX signal chain. The RX signal chain may be used to capture the test signal. A processing unit, or other suitable operating hardware and/or software combination may be used to extract a complex high order nonlinear model representative of the TX signal chain by analyzing the acquired test signal according to a specified algorithm. The TX signal chain may then be linearized, for example by using a digital processing unit, by predistorting input signals provided to the TX chain according to the extracted complex high-order nonlinear model. A non-linear model of the RX chain may similarly be obtained by operating the TX chain (signal path) in a high-linearity mode, generating linearized test signals in the TX path and providing those test signals to the RX path (RX chain), which may be configured to operate according to specified settings. The signal received by the RX chain may then be analyzed to extract the desired model similar to how the model for the TX was extracted.

Unlike previous solutions with predistortion that require specialized hardware and a dedicated loop that monitors the TX output, various embodiments disclosed herein don't require special dedicated hardware. Characterization may be performed once to extract the memory-less model, which holds for the measurement. Secondary effects that are a result of pre-distortion may also be considered, and their effect(s) canceled to first order.

Other aspects of the present invention will become apparent with reference to the drawings and detailed description of the drawings that follow.

BRIEF DESCRIPTION OF THE DRAWINGS

A better understanding of the present invention can be obtained when the following detailed description of the preferred embodiment is considered in conjunction with the following drawings, in which.

Figure 1:
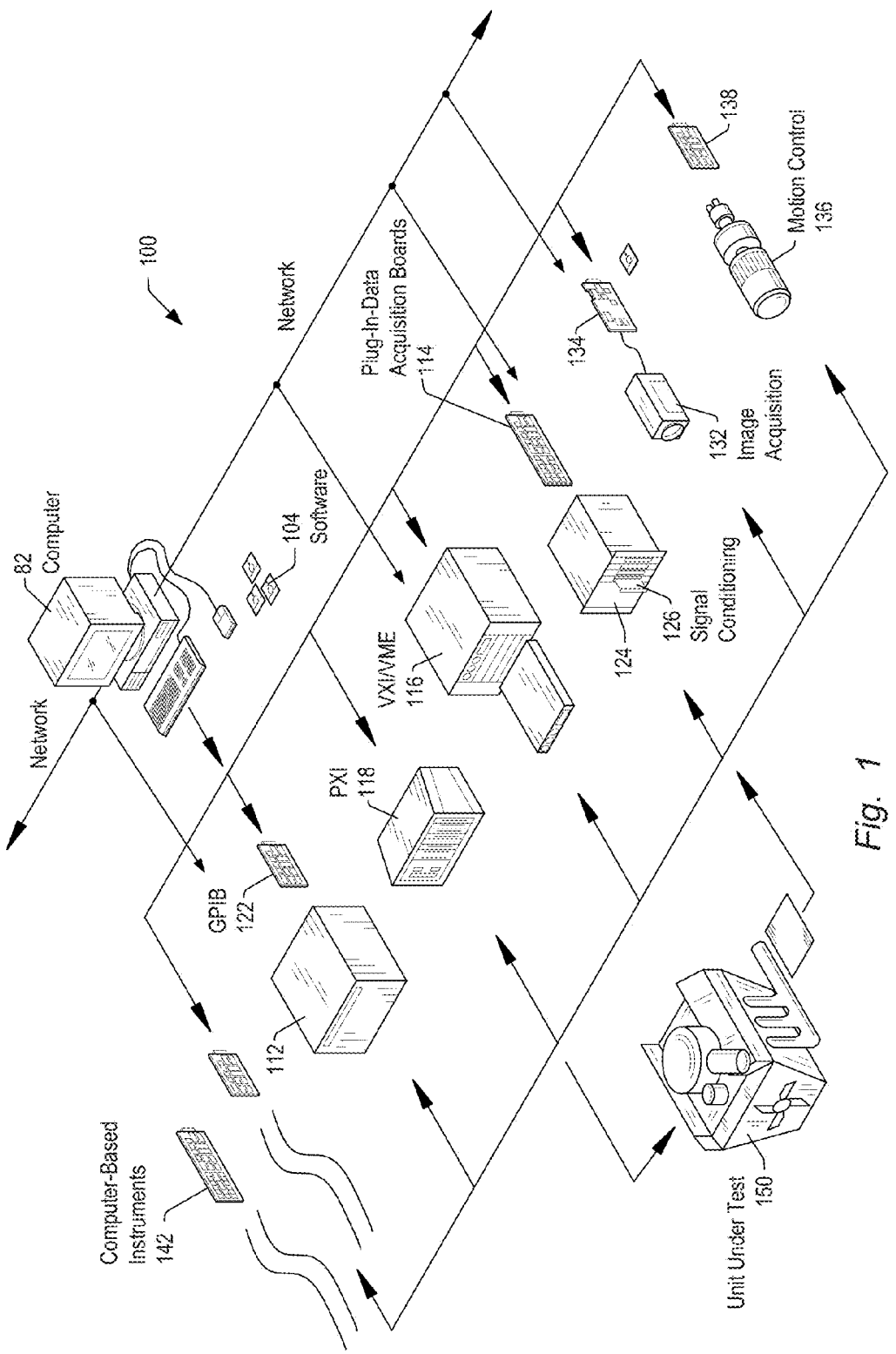
FIG. 1 shows an instrumentation control system with instruments networked together according to one embodiment of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

It is noted that the various terms or designations for circuits/components and signals as they appear herein, for example in such expressions as "switching circuit", "delay circuit", "source signal", "stimulus signal", etc. are merely names or identifiers used to distinguish among the different circuits/components and/or between different signals, and these terms are not intended to connote any specific meaning, unless directly indicated otherwise.

Embodiments of the present invention may be used in systems configured to perform test and/or measurement functions, to control and/or model instrumentation or industrial automation hardware, or to model and simulate functions, e.g., modeling or simulating a device or product being developed or tested, etc. More specifically, it may be used in various instances where transmit and/or receive path characterization may be required. However, it is noted that the present invention may equally be used for a variety of applications, and is not limited to the applications enumerated above. In other words, applications discussed in the present description are exemplary only, and the present invention may be used in any of various types of systems. Thus, the system and method of the present invention may be used in any number of different applications. It is noted that the various terms or designations for circuits/components as they appear herein, such as "feedback circuit", "measurement circuit", etc. are merely names or identifiers used to distinguish among the different circuits/components, and these terms are not intended to connote any specific, narrowly construed meaning.

FIG. 1 illustrates an exemplary instrumentation control system 100 which may be configured according to embodiments of the present invention. System 100 comprises a host computer 82 which may couple to one or more instruments configured to perform a variety of functions using timing control implemented according to various embodiments of the present invention. Host computer 82 may comprise a CPU, a display screen, memory, and one or more input devices such as a mouse or keyboard as shown. Computer 82 may operate with one or more instruments to analyze, measure, or control a unit under test (UUT) or process 150. The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The computer system may couple to and operate with one or more of these instruments. In some embodiments, the computer system may be coupled to one or more of these instruments via a network connection, such as an Ethernet connection, for example, which may facilitate running a high-level synchronization protocol between the computer system and the coupled instruments. The instruments may be coupled to the unit under test (UUT) or process 150, or may be coupled to receive field signals, typically generated by transducers. System 100 may be used in a data acquisition and control applications, in a test and measurement application, an image processing or machine vision application, a process control application, a man-machine interface application, a simulation application, or a hardware-in-the-loop validation application, among others.

Figure 2:
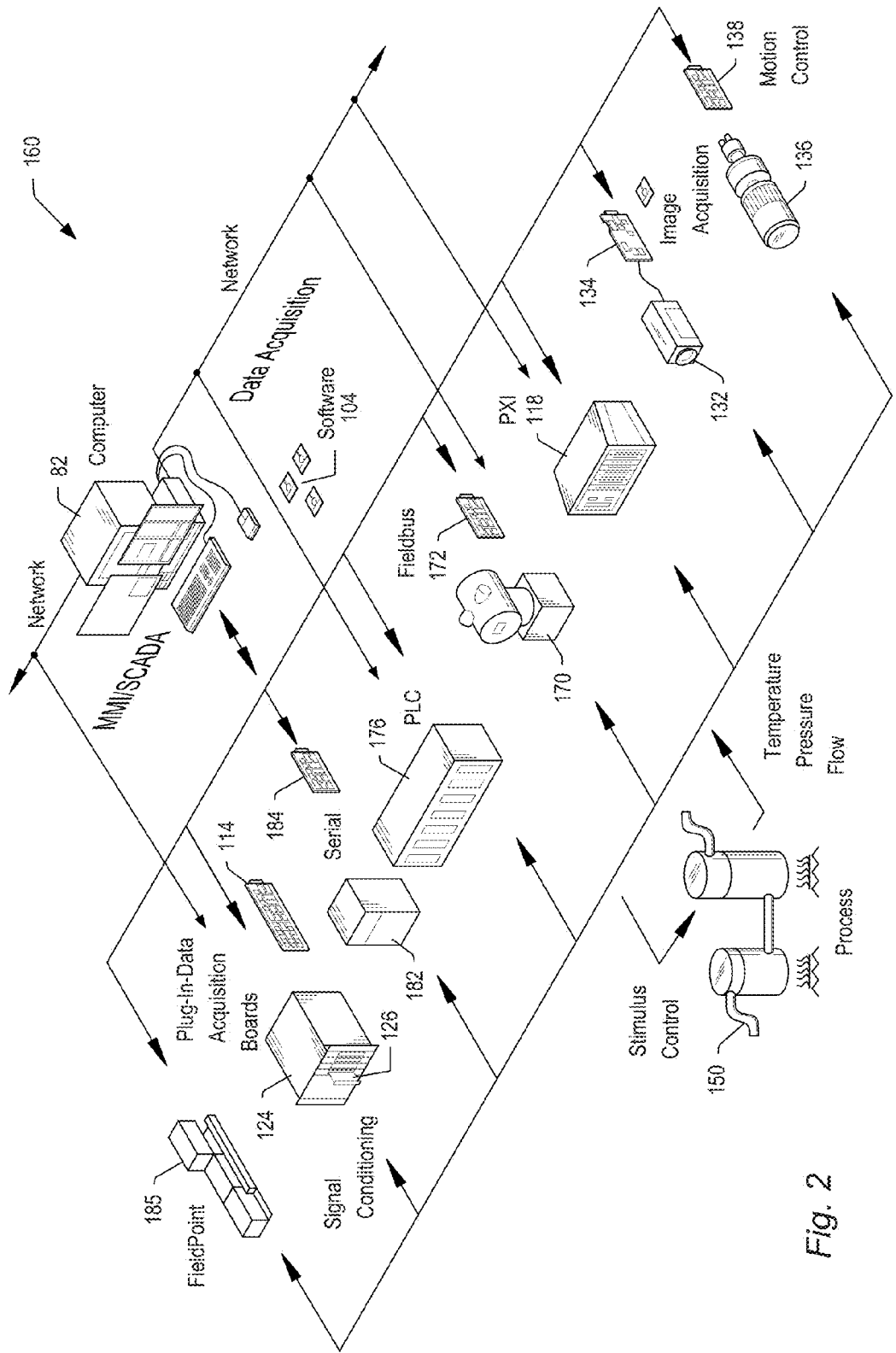
FIG. 2 shows an industrial automation system with instruments networked together according to one embodiment of the invention

FIG. 2 illustrates an exemplary industrial automation system 160 that may include embodiments of the present invention. Industrial automation system 160 may be similar to instrumentation or test and measurement system 100 shown in FIG. 2A. It should be noted that both systems 100 and 160 are merely shown as examples, and various embodiments of a shared oscillator configuration described herein may be used in a variety of other instrumentation or test configurations. Elements that are similar or identical to elements in FIG. 1 have the same reference numerals for convenience. System 160 may comprise a computer 82 which may couple to one or more devices and/or instruments configured to perform a variety of functions using timing control implemented according to various embodiments of the present invention. Computer 82 may comprise a CPU, a display screen, memory, and one or more input devices such as a mouse or keyboard as shown. Computer 82 may operate with the one or more devices and/or instruments to perform an automation function, such as MMI (Man Machine Interface), SCADA (Supervisory Control and Data Acquisition), portable or distributed data acquisition, process control, and advanced analysis, among others, on process or device 150.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a field bus device 170 and associated field bus interface card 172, a PLC (Programmable Logic Controller) 176, a serial instrument 182 and associated serial interface card 184, or a distributed data acquisition system, such as the Compact FieldPoint or CompactRIO systems available from National Instruments, among other types of devices. In some embodiments, similar to the system shown in FIG. 1, the computer system may couple to one or more of the instruments/devices via a network connection, such as an Ethernet connection.

Dynamic Characterization and Extraction of High-Order Nonlinear Models

In some embodiments, measurement or measuring instruments and devices, such as those shown in FIG. 1, may include vector signal generators (VSG), vector signal analyzers (VSA), and/or vector signal transceiver (VST) instruments. For a VST instrument, the RX/TX signal-chains may be configured such that only one of a receive (RX) or transmit (TX) signal chain nonlinearity is dominant, which allows for individual characterization of the transmit/receive signal chain's nonlinearity and for the successful extraction of the transmit/receive signal chain's complex nonlinear model. Furthermore, a transfer function of the transceiver may be characterized by performing a single measurement, as opposed to requiring two or more measurements to perform the characterization. Given a desired TX (high-power) configuration, the RX signal chain may be configured to provide very linear performance suitable for characterizing TX complex nonlinearity without introducing significant nonlinear effects. Once TX complex nonlinearity is characterized, linearization of the specific TX configuration may take place by means of digital pre-distortion. Other RX configurations—those that are not-as-linear as the one used for linearizing TX—may be characterized for complex nonlinearity using either linear TX configurations or the linearized TX configuration(s).

In one set of embodiments, the complex nonlinearity of RF (RX and TX) signal chains may be characterized by means of complex regression based on the digital baseband data (DAC/ADC data), without requiring additional data. The complex regression-based characterization of the nonlinearity results in extracting the complex linear and non-linear gains of the total signal chain, with the non-linear gain being dominated by either the TX or the RX signal chains. Standard compensation for the nonlinear gain of a particular signal chain usually induces secondary higher-order (but lower level) distortion components. Various embodiments allow for compensating for those secondary higher-order distortion components, as an option. It should be noted that the "secondary" effects are so designated because they may be the result of predistortion. For example, a simple $3^{rd}$ order predistortion may result in the generation of $9^{th}$ order secondary components. In other words, high-order predistortion and secondary effects of predistortion are considered two distinct effects that may each be given respective consideration. For example, performing $7^{th}$ order predistortion on a $7^{th}$ order system may result in output components of $49^{th}$ order. However, when considering secondary effects of $7^{th}$ order predistortion performed on a $7^{th}$ order system, not all secondary effects up to the $49^{th}$ order may have to be considered, limiting such considerations to secondary effects up to only the $9^{th}$ order, for example.

Various embodiments of a characterization system and method proposed herein provide a single-step based characterization approach, which may be fast, efficient, and non-iterative. In alternate embodiments, however, one or more iterations may be considered to further improve the results, while the characterization may be obtained without such iterations. An algorithm may be used to isolate passband components analytically, without having to employ over-sampling and/or decimation. RX and TX paths may be configured in such a manner that characterized nonlinearity may be attributed to only one of those paths (simple nonlinearity decoupling), but more sophisticated decoupling methods may be used as well. The process may also include a decoupling verification step. For example, in a TX case, immediately after measuring the outputs tones, the RX attenuation may be changed by a specified amount, e.g. X dB, and then the output tones may be measured again to verify that all tones changed by only X dB. This may provide verification that nonlinearity tones are generated in the TX path not in the RX path. Characterization may be achieved to high-order, e.g. not the basic third-order, but up to $9^{th}$ order or higher. Furthermore, predistortion order may be dynamically applied, that is, decisions whether to characterize/apply $3^{rd}$ order, $5^{th}$ order, or $7^{th}$ order, etc. may be dynamically determined/specified. This may be beneficial if high-order output tones aren't present in the characterization step (buried by noise), in which case it is preferable to stay below that order.

Various embodiments may include FPGA IP related to the implementation. In some embodiments, the self-characterization may be implemented as a normal calibration step (calibrated in manufacturing, which may be a fast process), with self-calibration serving to fine-tune or optimize when temperature variation is an issue. In one set of embodiments, non-symmetric two-tones with different respective amplitudes and phases may be used. Based on the algorithm and/or analysis performed, this may provide a regression-based solution with eight equations and four unknowns for $7^{th}$ order predistortion, and ten equations and five unknowns for $9^{th}$ order predistortion, as opposed to a standard solution, which may theoretically involve four equations with four unknowns for $7^{th}$ order predistortion, and five equations with five unknowns for $9^{th}$ order predistortion. It should be noted that the number of equations for the standard solution is indicated as being theoretical for the following reason. Using uneven tones results in equations that are independent from each other (e.g. the eight equations in case of $7^{th}$ order predistortion are independent from each other), and therefore facilitates "regression", since, for example for a $7^{th}$ order predistortion, the equation system includes eight independent equations with only four unknowns. On the other hand, the use of even tones results in four equation pairs that are independent from each other, with each equation pair including two theoretically identical equations. However, due to noise in the tone measurements and slight inaccuracy in the tone generation/measurement, the equations within each equation pair are not actually identical, slightly differing from each other without being fully independent. The algorithm and/or analysis performed may accommodate either case, that is, when either even tones or uneven tones are used. It should also be noted that as discussed herein, an ideal two-tone signal may be considered to be a two-tone signal generated in a perfectly linear TX signal chain, and such signal would not include any nonlinear components, such as $3^{rd}$, $5^{th}$, $7^{th}$, or higher order intermodulation distortion (IMD) components. However, when a two-tone signal is generated in a non-ideal (thus not perfectly linear) TX signal chain, the generated signal may also include IMD components of one or more orders.

As previously mentioned, various embodiments of dynamic extraction of complex high-order nonlinear models disclosed herein may target TX and RX signal chains of RF test and measurement instruments. Such signal chains may use linear class A amplifiers almost exclusively. Thus, digital pre-distortion (DPD) may be used to further enhance already good linearity performance to meet the high linearity requirements for testing to WLAN (Wide Local Area Network) and other mobile standards with better margins. One alternative to employing DPD may be the use of higher-power capable amplifiers, which, however, normally increases the power consumption and instrument cost. In some embodiments, linearization of RF transceiver and test systems may include two steps. First, during a model extraction step, a two-tone stimulus may be used to characterize the system response to the stimulus. Second, during a linearization step, may extracted model may be used to pre-distort generated signals, or post-distort received signals to improve linearity performance of TX and/or RX signal chains, respectively. The system may be modeled as memory-less, and thus provide a simpler solution than currently used methods. Moreover, unlike prior art solutions, various embodiments of a novel linearization disclosed herein do not require the test instruments to have dedicated hardware to perform the pre-distortion or post-distortion.

According to what has been described above, a method for performing dynamic extraction of complex high-order nonlinear models and its application may include two steps. As previously mentioned, during a model extraction portion, a two-tone stimulus may be used to characterize the system response (to the two-tone stimulus). Subsequently, during a linearization step, the extracted model may be used to pre-distort generated signals or post-distort received signals to improve linearity performance of the TX and/or RX signal chains, respectively. Various embodiments of the characterization and extraction system described herein are memory-less, and thus are simpler to implement than typical prior art solutions.

Figure 3:
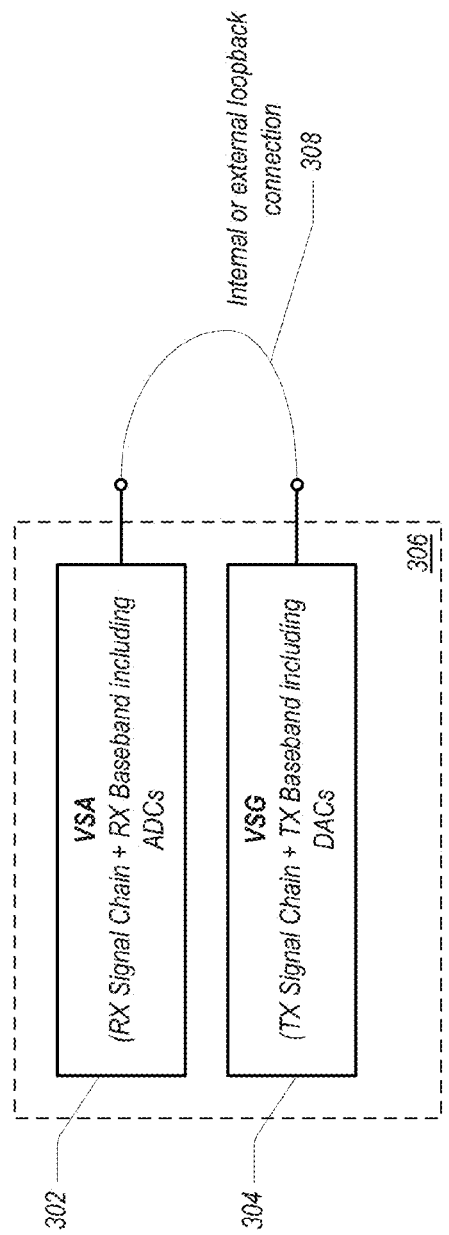
FIG. 3 shows one embodiment of a vector signal transceiver with a loopback connection for performing model extraction of the transmit and/or receive signal paths therein.

Moreover, unlike typical prior art solutions, the various embodiments disclosed herein do not require the test instruments to have dedicated hardware to perform the pre-distortion or post-distortion. Instead, a simple temporary loop-back connection may be used between the VSG and the VSA to perform the system characterization, as shown in FIG. 3. In the embodiment in FIG. 3, a VSA 302 having an RX signal chain and baseband including ADCs may be coupled via temporary loopback connection 308 to a VSG 304 having a TX signal chain and baseband including DACs. VSA 302 and VSG 304 are shown are part of a VST 306, but in alternate embodiments the TX and RX chains, respectively, may not necessarily be part of a VST, and may represent two independent transmission paths in different pieces of hardware (equipment). For the case where the VSG and the VSA are part of a single VST system, such as the one shown in FIG. 3, for example, the loop-back connection may be internal. Because the hardware setup is simple, the system definition is flexible. For instance, a VSG may be defined as a cascade configuration of a VSG and a power amplifier. A VSA may be defined as a cascade configuration of an LNA and a VSA. The key is to maintain the system definition between the characterization step and the linearization step.

System Definition and Configurations

Figure 4:
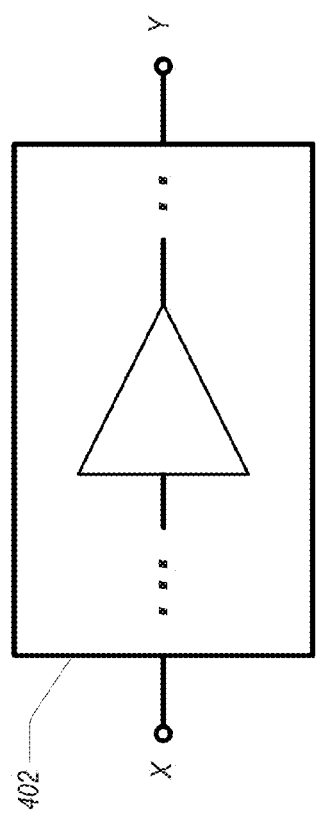
FIG. 4 shows a block diagram representation of one embodiment of a model of a transmission path.

As previously mentioned, the hardware setup simplicity and the fact that only a temporary loop-back connection may be required when using a VSA/VSG combination (or a single VST), leads to a flexible system definition. The VSA may be defined as an LNA (low noise amplifier) followed by a VSA, or the VSG may be defined as a VSG followed by a high power amplifier. Whatever the VSG or VSA definition is, it is maintained from the model extraction step to the linearization step. During the characterization step, the VSA (or RX signal chain) and the VSG (or the TX signal chain) may be connected in loop-back configuration. As such, an overall system model may take into consideration the input, X, what is written to and generated from the DAC, the output, Y, and what is input to and read from the ADC. The model, including nonlinearity, is thus a result of all the system elements between X and Y, including all active components within the TX and RX signal chains. Thus, from a high level system view, the model extraction step may operate as a characterization of an amplifier with a memory-less polynomial model, illustrated as element 402 in FIG. 4.

Figure 5:
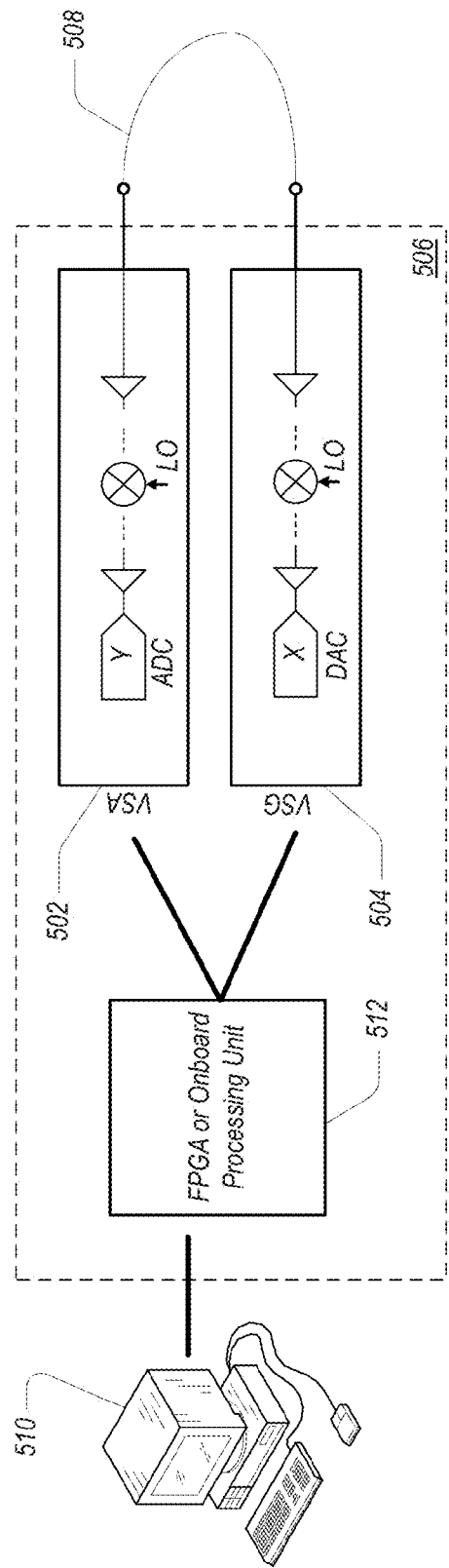
FIG. 5 shows the block diagram of one embodiment of a transceiver system with a loopback connection for performing model extraction of the transmit and/or receive signal paths therein.

FIG. 5 shows one embodiment of the system block diagram, including the system input X representing what is generated from the DAC included in VSG 504, and the system output Y representing what is read off the DAC included in VSG 504. A test or measurement system 506 is shown to include an onboard processing unit 512, which may be an FPGA (field programmable gate array) or a semi-custom or custom piece of hardware capable of providing and capturing the signals to and from VSG 504 and VSA 502, respectively. As shown in FIG. 5, a first signal path included in VSG 504 is a TX chain that includes the DAC, and a mixer to produce the RF signal from the converted received baseband signal according to a local oscillator (LO) signal. The output from VSG 506 is then fed back to the input of VSA 502, which includes a second signal path that is an RX chain with a mixer to recover the baseband signal through the use of a mixer according to an LO signal, and providing a digital signal to the onboard processing unit 512 through the ADC. A local host or computer 510 may be used to control/interface with system 506. In some embodiments, inputs provided to host 510 may be converted to the desired signals by onboard processing unit 512, which may also capture the output from VSA 502, and provide data/information back to host 510 for further processing as desired. That is, processing, including providing the signal to be written to the DAC and analyzing the signal read from the ADC, as well as applying the algorithm to extract the system nonlinear model, may be performed either on the onboard processing unit 512, or on the host computer 510, or a combination of both.

The model extraction step may be performed once per TX path configuration or RX path configuration. Each programmable configuration within the TX signal path (or chain) or RX signal path may have its own characterization and/or model extraction step, which may then be used to linearize that specific TX or RX configuration. When extracting the model of the TX signal path, a "linear" configuration is used on the RX signal path. When extracting the model of an RX signal path, a "linear" configuration is used on the TX signal path. The scheme, whereby a linear configuration of a first signal path is used when characterizing a second complement signal path (i.e. the second signal path is a complement of the first signal path, e.g. a TX signal path is the complement of an RX signal path and vice versa), is useful in decoupling the extracted cascade nonlinearity, and enables attributing it to the signal path targeted with the characterization and model extraction.

Linearity Considerations for Decoupling the Nonlinearity

TX signal paths (chains) or RX signal paths (chains) with active components are never perfectly linear. However, a signal chain utilized in the characterization step to complement the signal chain under test may be sufficiently linear to enable the methodology to attribute all extracted cascade nonlinearity to the signal chain targeted for characterization without introducing significant errors. Measurement-based TX signal chain linearization simulations may be performed to examine the perceived output-referred third-order intercept point (OTOI or OIP3) versus the characterizing signal chain third order intercept point (IIP3, i.e. VSA IIP3) for different types of characterization schemes as described herein. For example, an actual measured TX memory-less 9th order model may be used along with a simplified 3rd order RX model of known measured gain and simulation-swept linearity to observe the effect of the RX swept linearity performance on the TX model extraction, and consequently on the TX linearization performance. The VSA IIP3 may be split across the X-Y plane, as "magnitude" in dBm and phase (relative to the VSA linear gain phase) in degrees. In one case, the TX signal chain may be configured to generate two-tones at 7 dBm, each.

Based on the above, the TX signal chain OIP3—improved by predistortion that is based on 3rd-order characterization—may be generally dependent on how linear the VSA used in the characterization step is. For a sufficiently linear VSA (e.g. VSA IIP3>[Best TX OIP3+20 dB], which for this particular example is VSA IIP3>63 dBm) the phase of the 3rd-order nonlinear gain of the VSA relative to its linear gain phase may not influence the effectiveness of improving the TX OIP3. The resulting OIP3 may be sufficiently close to the best achievable OIP3, which is the case where a perfectly linear VSA is used. Using a VSA with an IIP3 equal to the best achievable OIP3 of the characterized device (e.g. 43 dBm in this case) leads to large phase-dependent variation in the resulting OIP3, and consequently to uncertainty in the desired improvement. In this case, the resulting OIP3 may range from 3 dB worse than the best achievable to excellent, almost perfect, linearity. The perfect linearity scenario may be achieved when the 3rd-order predistortion cancels not only the 3rd-order IMD (intermodulation distortion) tones, but also coincidentally the higher-order IMD components located at the 3rd-order tone location. This coincidental IMD tone cancellation resulting from an inaccurate measurement is unreliable, and thus it is not considered to be the best achievable.

Whereas the VSA used in characterizing a TX signal chain for the purpose of linearizing the TX signal chain is expected to be fairly linear, that expectation is not overly restrictive. As discussed above, even when using a VSA with an IIP3 equal to the "target" improved OIP3, the degradation to the target OIP3 due to the VSA nonlinearity is limited to 3 dB. In the case of the device performance based on the example above, this means improving the OIP3 from 31.5 dBm to 40 dBm instead of 43 dBm. In fact, only a 6-dB-edge may be needed for the characterizing VSA over the characterized TX signal chain (or VSG) to arrive at an OIP3 that is only 1 dB short of the best achievable (i.e. with a perfectly linear VSA).

Similar observations may be made when using 9th-order characterization and linearization that takes into account secondary effects. The same TX signal chain may achieve 51.5 dBm OIP3, up 20 dB from its nonlinearized performance when using a sufficiently linear VSA. For a VSA that has the same IIP3 at the target OIP3 (i.e. 51.5 dBm), the resulting worst-case linearized OIP3 is 48.5 dBm, 3 dB lower than the best achievable OIP3. Using a VSA with an IIP3 that is 6 dB better than the target OIP3 (i.e. 57.5 dBm), the resulting worst-case linearized OIP3 is 50.5 dBm, only 1 dB worse than the best achievable value. In summary, as a general rule, the signal chain used in the characterization step may be specified to have an IP3 that is at least 6 dB (preferably 10 dB or more) better than the target linearized IP3 of the signal chain under test.

Extraction of Complex $3^{rd}$-Order Nonlinear Models

Considering a system such as the one described above (e.g. as seen in FIG. 5), where the input is X, the output is $Y_3$, the transfer function relating them may expressed as presented in (1).

$$Y_3 = \alpha_1 X - \alpha_2 X^2 - \alpha_3 X^3 \quad (1)$$

Let X be defined as a two-tone stimulus, where $\omega_c$ is the angular RF frequency in radians/sec, $\varphi_x$ is the phase-offset and is generally a function of time, and $A_x$ is the tone amplitude and is generally a function of time, as presented in (2).

$$X = A_1 \cos(\omega_c t + \varphi_1) + A_2 \cos(\omega_c t + \varphi_2) \quad (2)$$

Then, $Y_3$ may be expanded after substituting X as defined in (2) back in (1). Considering only the passband components of the resulting $Y_3$ yields $Y_{3PB}$, as shown in (3).

$$Y_{3PB} = \left(\alpha_1 A_1 - \frac{3}{4}\alpha_3 A_1^3 - \frac{3}{2}\alpha_3 A_1 A_2^2\right)\cos(\omega_c t + \varphi_1) + \quad (3)$$
$$\left(\alpha_1 A_2 - \frac{3}{4}\alpha_3 A_2^3 - \frac{3}{2}\alpha_3 A_2 A_1^2\right)\cos(\omega_c t + \varphi_2) - $$
$$\frac{3}{4}\alpha_3 A_1^2 A_2 \cos(\omega_c t + 2\varphi_1 - \varphi_2) - \frac{3}{4}\alpha_3 A_2^2 A_1 \cos(\omega_c t + 2\varphi_2 - \varphi_1)$$

To relate $Y_{3PB}$ to its equivalent baseband complex signal, first an amplitude- and phase-modulated RF carrier signal, $A\cdot\cos(\omega_c t+\varphi)$, may be considered, where A and $\varphi$, the amplitude and phase, respectively, are generally functions of time. This RF passband signal may be decomposed into and an in-phase (I) and a quadrature (Q) components, as shown in (4).

$$A\cos(\omega_c t + \varphi) = I\cos(\omega_c t) - Q\sin(\omega_c t) \quad (4)$$

Where:

$$\begin{cases} I = A\cos\varphi \\ Q = A\sin\varphi \end{cases}$$

The baseband complex signal, labeled Z, may thus be defined in (5), and the real RF signal may be expressed as shown in (6).

$$Z = I + jQ = Ae^{j\varphi} \quad (5)$$

$$A\cos(\omega_c t + \varphi) = Re\{Ze^{j\omega_c t}\} \quad (6)$$

By applying (4) to (3), the I and Q components of $Y_{3PB}$ may be expressed. Then, the baseband complex signal equivalent of $Y_{3PB}$, $Z_{Y_{3PB}}$ may be obtained per (5), as expressed in (7). In a similar manner to $Y_{3PB}$ expressed in terms of its baseband complex equivalent, the input signal X may also be expressed in terms of its baseband complex equivalent, as shown in (8).

$$Z_{Y_{3PB}} = \left(\alpha_1 A_1 - \frac{3}{4}\alpha_3 A_1^3 - \frac{3}{2}\alpha_3 A_1 A_2^2\right)e^{j\varphi_1} + \quad (7)$$
$$\left(\alpha_1 A_2 - \frac{3}{4}\alpha_3 A_2^3 - \frac{3}{2}\alpha_3 A_2 A_1^2\right)e^{j\varphi_2} - $$
$$\frac{3}{4}\alpha_3 A_1^2 A_2 e^{j(2\varphi_1 - \varphi_2)} - \frac{3}{4}\alpha_3 A_2^2 A_1 e^{j(2\varphi_2 - \varphi_1)}$$

$$Z_X = A_1 e^{j\varphi_1} + A_2 e^{j\varphi_2} \quad (8)$$

Thus, starting with a known baseband input that is defined by the user at the DAC level as described with respect to FIG. 5, for example, results in a baseband output obtained from the ADC, where the input and output are expressed in (8) and (7), respectively. Using a single-tone extraction algorithm, single-tones may be extracted from the output baseband signal (as well as from the user-defined and known input signal), and the amplitude and phase of the extracted tones may be used to define individual complex numbers representing the single-tones. From the input signal, two complex numbers may be extracted corresponding to the two main tones generated. The two complex numbers are termed $IMT_1$ and $IMT_2$, corresponding to the two input main tones $A_1 e^{j\varphi_1}$ and $A_2 e^{j\varphi_2}$ shown in (8), respectively. Similarly, four complex numbers may be extracted from the output signal, corresponding to the two main output tones and the two IMD3 tones. The four complex numbers are termed $OMT_1$, $OMT_2$, $IMD3_1$, and $IMD3_2$, corresponding to the $Ae^{j\varphi}$ terms shown in order in (7), respectively. Based on the single-tone measurements discussed above, the following matrix-form equation may be written.

$$\begin{bmatrix} \frac{OMT_1}{IMT_1} \\ \frac{OMT_2}{IMT_2} \\ IMD3_1 \frac{IMT_2}{IMT_1^2} \\ IMD3_2 \frac{IMT_1}{IMT_2^2} \end{bmatrix} = \begin{bmatrix} V_{\alpha_1} & V_{\alpha_3} \end{bmatrix} \begin{bmatrix} \alpha_1 \\ \alpha_3 \end{bmatrix} \quad (9)$$

Where: $V_{\alpha_1} = \begin{bmatrix} 1 \\ 1 \\ 0 \\ 0 \end{bmatrix}$ and $V_{\alpha_3} = \begin{bmatrix} -\frac{3}{4}(A_1^2 + 2A_2^2) \\ -\frac{3}{4}(A_2^2 + 2A_1^2) \\ -\frac{3}{4}A_2^2 \\ -\frac{3}{4}A_1^2 \end{bmatrix}$ It should be noted that the linear gain vector $V_{\alpha_1}$ has zeroes corresponding to the IMD3 tones because the linear gain does not generate tones at the IMD3 tone frequencies. The $3^{rd}$-order gain vector $V_{\alpha_3}$ on the other hand does contribute tones at the main tone frequencies, which is why the first two elements in the vector are not null. The left side of (9) is based on the complex numbers formed from the single-tone measurements discussed above. The 4×2 matrix on the right side is based on only the real-value amplitudes of the input main tone signals, which are known to the user, but which may still be evaluated using the single-tone extraction algorithm when applied to the input signal itself (i.e. the signal that gets written to the DAC). It also worth nothing regarding the single-tone extraction procedure that the search window for a particular single-tone may preferably be designed to include the single-tone desired for extraction and no other tone. For example, for the tone expressed by $-\frac{3}{4}\alpha_3 A_1^2 A_2 e^{j(2\varphi_1-\varphi_2)}$, the search window of the single-tone extraction algorithm may be centered about a frequency of $(2\varphi_1-\varphi_2)$ in Hz without including the neighboring tone frequency of $\varphi_1$.

With (9) including four equations with two unknowns, a least-square complex regression algorithm may be used to evaluate the only unknowns in (9), $\alpha_1$ and $\alpha_3$. Once found, $\alpha_1$ and $\alpha_3$ solve the question about the linear and $3^{rd}$-order gain of the cascade system, as defined between the DAC and the ADC (in FIG. 5), passing through the TX RF signal chain (signal path), the loopback connection, and the RX RF signal chain (signal path). If the linear gain of the RX signal chain (or the VSA) is known, it is possible to find the linear gain of only the TX signal chain, from the DAC to the RF output or the loopback connection (again, referencing FIG. 5). Normally, a standard VSA provides measurements that are automatically referred to the VSA input, which in this case is at the same level as the TX signal chain output or the loopback connection. By utilizing the VSA in a sufficiently linear configuration as previously described, the $3^{rd}$-order gain found may be attributed solely to the TX signal chain. Thus, the obtained $\alpha_1$ and $\alpha_3$ may be attributed solely to the TX signal chain under test, and may then be used to perform predistortion towards linearization. As mentioned earlier, this analysis equally applies towards extracting the complex nonlinear model of a receiver signal chain (TX signal path) as well, in which case the characterizing signal chain would be a linear (or a linearized) TX signal chain. In such a case, the TX OIP3 is selected to be higher than the target linearized IIP3 of the RX signal chain under test.

Extraction of Complex $5^{th}$-Order Nonlinear Models

Extending the analysis provided above to $5^{th}$-order involves first extending the system model shown in (1) to $5^{th}$-order, as shown in (10).

$$Y_5 = Y_3 - \alpha_4 X^4 - \alpha_5 X^5 \quad (10)$$

Using the same input signal X as shown in (2), $Y_5$ expressed in (10) may be expanded. Then, the passband components of $Y_5$ may be collected and presented in a similar manner to what is expressed in (3). The resulting $5^{th}$-order passband $Y_5$ is shown in (11) as $Y_{5PB}$. Extracting the baseband complex signal from $Y_{5PB}$ may be performed using (4) and (5), and consequently $Z_{Y_{5PB}}$ may be expressed as in (12). Formulating the $5^{th}$-order version of the matrix equation shown in (9) includes identifying additional tones from within the output complex baseband waveform, and consequently using additional complex numbers in the matrix-form equation. The input and output main tones remain the same in terms of their expected frequency location within the baseband spectrum. Similarly, the $3^{rd}$-order IMD tones remain at the same frequency. The additional tones are two $5^{th}$-order IMD (IMD5) tones and they are located at the frequencies $(3\varphi_1-2\varphi_2)$ and $(3\varphi_2-2\varphi_1)$. The corresponding complex numbers representing the tones are termed $IMD5_1$ and $IMD5_2$, respectively.

$$Y_{5PB} = Y_{3PB} - \left(\frac{10}{16}\alpha_5 A_1^5 + \frac{60}{16}\alpha_5 A_1^3 A_2^2 + \frac{30}{16}\alpha_5 A_1 A_2^4\right)\cos(\omega_c t + \varphi_1) - \\ \left(\frac{10}{16}\alpha_5 A_2^5 + \frac{60}{16}\alpha_5 A_2^3 A_1^2 + \frac{30}{16}\alpha_5 A_2 A_1^4\right)\cos(\omega_c t + \varphi_2) - \\ \left(\frac{20}{16}\alpha_5 A_1^4 A_2 + \frac{30}{16}\alpha_5 A_1^2 A_2^3\right)\cos(\omega_c t + 2\varphi_1 - \varphi_2) - \\ \left(\frac{20}{16}\alpha_5 A_2^4 A_1 + \frac{30}{16}\alpha_5 A_2^2 A_1^3\right)\cos(\omega_c t + 2\varphi_2 - \varphi_1) - \\ \frac{10}{16}\alpha_5 A_1^3 A_2^2 \cos(\omega_c t + 3\varphi_1 - 2\varphi_2) - \frac{10}{16}\alpha_5 A_2^3 A_1^2 \cos(\omega_c t + 3\varphi_2 - 2\varphi_1) \quad (11)$$

$$Z_{Y_{5PB}} = Z_{Y_{3PB}} - \left(\frac{10}{16}\alpha_5 A_1^5 + \frac{60}{16}\alpha_5 A_1^3 A_2^2 + \frac{30}{16}\alpha_5 A_1 A_2^4\right)e^{j\varphi_1} - \\ \left(\frac{10}{16}\alpha_5 A_2^5 + \frac{60}{16}\alpha_5 A_2^3 A_1^2 + \frac{30}{16}\alpha_5 A_2 A_1^4\right)e^{j\varphi_2} - \\ \left(\frac{20}{16}\alpha_5 A_1^4 A_2 + \frac{30}{16}\alpha_5 A_1^2 A_2^3\right)e^{j(2\varphi_1-\varphi_2)} - \\ \left(\frac{20}{16}\alpha_5 A_2^4 A_1 + \frac{30}{16}\alpha_5 A_2^2 A_1^3\right)e^{j(2\varphi_2-\varphi_1)} - \\ \frac{10}{16}\alpha_5 A_1^3 A_2^2 e^{j(3\varphi_1-2\varphi_2)} - \frac{10}{16}\alpha_5 A_2^3 A_1^2 e^{j(3\varphi_2-2\varphi_1)} \quad (12)$$

The $5^{th}$-order matrix form system is presented in (13), where $V_{\alpha_1}$, $V_{\alpha_3}$, and $V_{\alpha_5}$ are 6-element vectors corresponding to the complex gain parameters $\alpha_1$, $\alpha_3$, and $\alpha_5$, and detailed in (13) as well. It should be noted that $V_{\alpha_1}$ and $V_{\alpha_3}$ are only different from the corresponding vectors shown in (9) by the padded zeroes at the bottom. This is because the linear gain $\alpha_1$ and the $3^{rd}$-order gain $\alpha_3$ do not generate any tones at the IMD5 tone frequency. However, the $5^{th}$-order gain $\alpha_5$ does generate tones at the frequencies corresponding to the main tones and the IMD3 tones, as can be seen from (13), in the first 4 elements of $V_{\alpha_5}$.

Similar to how the $3^{rd}$-order complex system model is extracted, the $5^{th}$-order model may be extracted by solving for $\alpha_1$, $\alpha_3$, and $\alpha_5$ in (13). The even-order gain coefficients are set to $$\begin{bmatrix} \dfrac{OMT_1}{IMT_1} \\ \dfrac{OMT_2}{IMT_2} \\ IMD3_1 \dfrac{IMT_2}{IMT_1^2} \\ IMD3_2 \dfrac{IMT_1}{IMT_2^2} \\ IMD5_1 \dfrac{IMT_2^2}{IMT_1^3} \\ IMD5_2 \dfrac{IMT_1^2}{IMT_2^3} \end{bmatrix} = [V_{\alpha_1} \quad V_{\alpha_3} \quad V_{\alpha_5}] \begin{bmatrix} \alpha_1 \\ \alpha_3 \\ \alpha_5 \end{bmatrix}$$

Where: $V_{\alpha_1}$ and $V_{\alpha_3}$ in this case are padded with two zeroes each, compared to the (13) definition in (9), and $$V_{\alpha_5} = \begin{bmatrix} -\dfrac{10}{16}(A_1^4 + 6A_1^2 A_2^2 + 3A_2^4) \\ -\dfrac{10}{16}(A_2^4 + 6A_1^2 A_2^2 + 3A_1^4) \\ -\dfrac{10}{16}(2A_1^2 A_2^2 + 3A_2^4) \\ -\dfrac{10}{16}(2A_1^2 A_2^2 + 3A_1^4) \\ -\dfrac{10}{16}A_2^4 \\ -\dfrac{10}{16}A_1^4 \end{bmatrix}.$$

Extraction of Complex $7^{th}$-Order Nonlinear Models

The analysis for extracting the system model may also be extended to $7^{th}$-order. The same methodology flow may be maintained as in the previous $3^{rd}$-order and $5^{th}$-order cases. There are two more tones characterized at the output baseband complex signal, which are the $7^{th}$-order IMD tones, $IMD7_1$ and $IMD7_2$ tones located at the frequencies $(4\varphi_1-3\varphi_2)$ and $(4\varphi_2-3\varphi_1)$, respectively. The system model is shown in (14).

$$Y_7 = Y_5 - \alpha_6 X^6 - \alpha_7 X^7 \qquad (14)$$

Using this system model and the same two-tone input signal X shown in (2), $Y_7$ may be expanded, and $Y_{7PB}$ may be extracted from it by collecting the passband elements of $Y_7$. $Y_{7PB}$ is expressed in (15), and the baseband complex equivalent $Z_{Y_{7PB}}$ is expressed in (16).

The matrix form for $7^{th}$-order systems is presented below in (17), with the vectors for the lower order gain coefficient maintained and padded with two zeroes on the bottom, each. Two additional tones are measured at the baseband complex output, and they are the $7^{th}$-order IMD tones, $IMD7_1$ and $IMD7_2$ located at frequencies $(4\varphi_1-3\varphi_2)$ and $(4\varphi_2-3\varphi_1)$, respectively.

$$Y_{7PB} = Y_{5PB} - \left(\dfrac{35}{64}A_1^7 + \dfrac{420}{64}A_2^2 A_1^5 + \dfrac{630}{64}A_2^4 A_1^3 + \dfrac{140}{64}A_2^6 A_1\right)\cos(\omega_c t + \varphi_1) - $$
$$\left(\dfrac{35}{64}A_2^7 + \dfrac{420}{64}A_2^5 A_1^2 + \dfrac{630}{64}A_2^3 A_1^4 + \dfrac{140}{64}A_2 A_1^6\right)\cos(\omega_c t + \varphi_2) - $$
$$\left(\dfrac{105}{64}A_2 A_1^6 + \dfrac{420}{64}A_2^3 A_1^4 + \dfrac{210}{64}A_2^5 A_1^2\right)\cos(\omega_c t + 2\varphi_1 - \varphi_2) - $$
$$\left(\dfrac{105}{64}A_2^6 A_1 + \dfrac{420}{64}A_2^4 A_1^3 + \dfrac{210}{64}A_2^2 A_1^5\right)\cos(\omega_c t + 2\varphi_2 - \varphi_1) - $$
$$\left(\dfrac{105}{64}A_2^2 A_1^5 + \dfrac{140}{64}A_2^4 A_1^3\right)\cos(\omega_c t + 3\varphi_1 - 2\varphi_2) - $$
$$\left(\dfrac{105}{64}A_2^5 A_1^2 + \dfrac{140}{64}A_2^3 A_1^4\right)\cos(\omega_c t + 3\varphi_2 - 2\varphi_1) - $$
$$\dfrac{35}{64}A_2^3 A_1^4 \cos(\omega_c t + 4\varphi_1 - 3\varphi_2) - \dfrac{35}{64}A_2^4 A_1^3 \cos(\omega_c t + 4\varphi_2 - 3\varphi_1) \qquad (15)$$

$$Z_{Y_{7PB}} = Z_{Y_{5PB}} - \left(\dfrac{35}{64}A_1^7 + \dfrac{420}{64}A_2^2 A_1^5 + \dfrac{630}{64}A_2^4 A_1^3 + \dfrac{140}{64}A_2^6 A_1\right)e^{j\varphi_1} - $$
$$\left(\dfrac{35}{64}A_2^7 + \dfrac{420}{64}A_2^5 A_1^2 + \dfrac{630}{64}A_2^3 A_1^4 + \dfrac{140}{64}A_2 A_1^6\right)e^{j\varphi_2} - $$
$$\left(\dfrac{105}{64}A_2 A_1^6 + \dfrac{420}{64}A_2^3 A_1^4 + \dfrac{210}{64}A_2^5 A_1^2\right)e^{j(2\varphi_1 - \varphi_2)} - $$
$$\left(\dfrac{105}{64}A_2^6 A_1 + \dfrac{420}{64}A_2^4 A_1^3 + \dfrac{210}{64}A_2^2 A_1^5\right)e^{j(2\varphi_2 - \varphi_1)} - $$
$$\left(\dfrac{105}{64}A_2^2 A_1^5 + \dfrac{140}{64}A_2^4 A_1^3\right)e^{j(3\varphi_1 - 2\varphi_2)} - $$
$$\left(\dfrac{105}{64}A_2^5 A_1^2 + \dfrac{140}{64}A_2^3 A_1^4\right)e^{j(3\varphi_2 - 2\varphi_1)} - $$
$$\dfrac{35}{64}A_2^3 A_1^4 e^{j(4\varphi_1 - 3\varphi_2)} - \dfrac{35}{64}A_2^4 A_1^3 e^{j(4\varphi_2 - 3\varphi_1)} \qquad (16)$$

By solving the system matrix equation in (17) for the odd gain coefficients $\alpha_1$-$\alpha_7$, and setting the even gain coefficients to zero, the $7^{th}$-order complex system model may be evaluated and ready for use in linearization.

$$\begin{bmatrix} \dfrac{OMT_1}{IMT_1} \\ \dfrac{OMT_2}{IMT_2} \\ IMD3_1 \dfrac{IMT_2}{IMT_1^2} \\ IMD3_2 \dfrac{IMT_1}{IMT_2^2} \\ IMD5_1 \dfrac{IMT_2^2}{IMT_1^3} \\ IMD5_2 \dfrac{IMT_1^2}{IMT_2^3} \\ IMD7_1 \dfrac{IMT_2^3}{IMT_1^4} \\ IMD7_2 \dfrac{IMT_1^3}{IMT_2^4} \end{bmatrix} = [V_{\alpha_1} \quad V_{\alpha_3} \quad V_{\alpha_5} \quad V_{\alpha_7}] \begin{bmatrix} \alpha_1 \\ \alpha_3 \\ \alpha_5 \\ \alpha_7 \end{bmatrix} \qquad (17)$$

Where: $V_{\alpha_1}$, $V_{\alpha_3}$, and $V_{\alpha_5}$ in this case are padded with two zeroes each, compared to the definition in (13), and, $$V_{\alpha_7} = \begin{bmatrix} -\frac{35}{64}(A_1^6 + 12A_2^2A_1^4 + 18A_2^4A_1^2 + 4A_2^6) \\ -\frac{35}{64}(A_2^6 + 12A_1^2A_2^4 + 18A_1^4A_2^2 + 4A_1^6) \\ -\frac{35}{64}(3A_2^2A_1^4 + 12A_2^4A_1^2 + 6A_2^6) \\ -\frac{35}{64}(3A_1^2A_2^4 + 12A_1^4A_2^2 + 6A_1^6) \\ -\frac{35}{64}(3A_2^4A_1^2 + 4A_2^6) \\ -\frac{35}{64}(3A_1^4A_2^2 + 4A_1^6) \\ \frac{35}{64}A_2^6 \\ -\frac{35}{64}A_1^6 \end{bmatrix}.$$

Extraction of Complex $9^{th}$-Order Nonlinear Models

The analysis for extracting the system model may be further extended to $9^{th}$-order. The same methodology flow may be maintained as in the previous lower order cases. There are two more tones characterized at the output baseband complex signal relative to the $7^{th}$-order case, which are the $9^{th}$-order IMD tones, $IMD9_1$ and $IMD9_2$ tones located at the frequencies $(5\varphi_1 - 4\varphi_2)$ and $(5\varphi_2 - 4\varphi_1)$, respectively. The system model is shown in (18).

$$Y_9 = Y_7 - \alpha_8 X^8 - \alpha_9 X^9 \tag{18}$$

Using this system model and the same two-tone input signal X shown in (2), $Y_9$ may be expanded, and $Y_{9PB}$ may be extracted from it by collecting the passband elements of $Y_9$. $Y_{9PB}$ is expressed in (19), and the baseband complex equivalent $Z_{Y_{7PB}}$ is expressed in (20). The matrix form for $9^{th}$-order systems is presented below in (21), with the vectors for the lower order gain coefficient maintained and padded with two zeroes on the bottom, each. Two additional tones are measured at the baseband complex output and they are the $9^{ill}$-order IMD tones, $IMD9_1$ and $IMD9_2$ located at frequencies $(5\varphi_1 - 4\varphi_2)$ and $(5\varphi_2 - 4\varphi_1)$, respectively.

$$Y_{9PB} = Y_{7PB} - \left(\frac{63}{128}A_1^9 + \frac{1260}{128}A_2^2A_1^7 + \frac{3780}{128}A_2^4A_1^5 + \frac{2520}{128}A_2^6A_1^3 + \frac{315}{128}A_1A_2^8\right) \cos(\omega_c t + \varphi_1) -$$
$$\left(\frac{63}{128}A_2^9 + \frac{1260}{128}A_1^2A_2^7 + \frac{3780}{128}A_1^4A_2^5 + \frac{2520}{128}A_1^6A_2^3 + \frac{315}{128}A_2A_1^8\right) \cos(\omega_c t + \varphi_2) -$$
$$\left(\frac{252}{128}A_2A_1^8 + \frac{1890}{128}A_2^3A_1^6 + \frac{2520}{128}A_2^5A_1^4 + \frac{630}{128}A_1^2A_2^7\right) \cos(\omega_c t + 2\varphi_1 - \varphi_2) -$$
$$\left(\frac{252}{128}A_1A_2^8 + \frac{1890}{128}A_1^3A_2^6 + \frac{2520}{128}A_1^5A_2^4 + \frac{630}{128}A_2^2A_1^7\right) \cos(\omega_c t + 2\varphi_2 - \varphi_1) -$$
$$\left(\frac{378}{128}A_2^2A_1^7 + \frac{1260}{128}A_2^4A_1^5 + \frac{630}{128}A_1^3A_2^6\right) \cos(\omega_c t + 3\varphi_1 - 2\varphi_2) -$$
$$\left(\frac{378}{128}A_1^2A_2^7 + \frac{1260}{128}A_1^4A_2^5 + \frac{630}{128}A_2^3A_1^6\right) \cos(\omega_c t + 3\varphi_2 - 2\varphi_1) - \tag{19}$$

$$\left(\frac{252}{128}A_2^3A_1^6 + \frac{315}{128}A_1^4A_2^5\right) \cos(\omega_c t + 4\varphi_1 - 3\varphi_2) -$$
$$\left(\frac{252}{128}A_1^3A_2^6 + \frac{315}{128}A_2^4A_1^5\right) \cos(\omega_c t + 4\varphi_2 - 3\varphi_1) -$$
$$\frac{63}{128}A_1^5A_2^4 \cos(\omega_c t + 5\varphi_1 - 4\varphi_2) - \frac{63}{128}A_2^5A_1^4 \cos(\omega_c t + 5\varphi_2 - 4\varphi_1) \tag{20}$$

$$Z_{Y_{9PB}} = Z_{Y_{7PB}} -$$
$$\left(\frac{63}{128}A_1^9 + \frac{1260}{128}A_2^2A_1^7 + \frac{3780}{128}A_2^4A_1^5 + \frac{2520}{128}A_2^6A_1^3 + \frac{315}{128}A_1A_2^8\right) e^{j\varphi_1} -$$
$$\left(\frac{63}{128}A_2^9 + \frac{1260}{128}A_1^2A_2^7 + \frac{3780}{128}A_1^4A_2^5 + \frac{2520}{128}A_1^6A_2^3 + \frac{315}{128}A_2A_1^8\right) e^{j\varphi_2} -$$
$$\left(\frac{252}{128}A_2A_1^8 + \frac{1890}{128}A_2^3A_1^6 + \frac{2520}{128}A_2^5A_1^4 + \frac{630}{128}A_1^2A_2^7\right) e^{j(2\varphi_1 - \varphi_2)} -$$
$$\left(\frac{252}{128}A_1A_2^8 + \frac{1890}{128}A_1^3A_2^6 + \frac{2520}{128}A_1^5A_2^4 + \frac{630}{128}A_2^2A_1^7\right) e^{j(2\varphi_2 - \varphi_1)} -$$
$$\left(\frac{378}{128}A_2^2A_1^7 + \frac{1260}{128}A_2^4A_1^5 + \frac{630}{128}A_1^3A_2^6\right) e^{j(3\varphi_1 - 2\varphi_2)} -$$
$$\left(\frac{378}{128}A_1^2A_2^7 + \frac{1260}{128}A_1^4A_2^5 + \frac{630}{128}A_2^3A_1^6\right) e^{j(3\varphi_2 - 2\varphi_1)} -$$
$$\left(\frac{252}{128}A_2^3A_1^6 + \frac{315}{128}A_1^4A_2^5\right) e^{j(4\varphi_1 - 3\varphi_2)} -$$
$$\left(\frac{252}{128}A_1^3A_2^6 + \frac{315}{128}A_2^4A_1^5\right) e^{j(4\varphi_2 - 3\varphi_1)} -$$
$$\frac{63}{128}A_1^5A_2^4 e^{j(5\varphi_1 - 4\varphi_2)} - \frac{63}{128}A_2^5A_1^4 e^{j(5\varphi_2 - 4\varphi_1)} \tag{21}$$

$$\begin{bmatrix} \frac{OMT_1}{IMT_1} \\ \frac{OMT_2}{IMT_2} \\ IMD3_1 \frac{IMT_2}{IMT_1^2} \\ IMD3_2 \frac{IMT_1}{IMT_2^2} \\ IMD5_1 \frac{IMT_2^2}{IMT_1^3} \\ IMD5_2 \frac{IMT_1^2}{IMT_2^3} \\ IMD7_1 \frac{IMT_2^3}{IMT_1^4} \\ IMD7_2 \frac{IMT_1^3}{IMT_2^4} \\ IMD9_1 \frac{IMT_2^4}{IMT_1^5} \\ IMD9_2 \frac{IMT_1^4}{IMT_2^5} \end{bmatrix} = \begin{bmatrix} V_{\alpha_1} & V_{\alpha_3} & V_{\alpha_5} & V_{\alpha_7} & V_{\alpha_9} \end{bmatrix} \begin{bmatrix} \alpha_1 \\ \alpha_3 \\ \alpha_5 \\ \alpha_7 \\ \alpha_9 \end{bmatrix}$$

Where: $V_{\alpha_1}$, $V_{\alpha_3}$, $V_{\alpha_5}$, and $V_{\alpha_7}$ in this case are padded with two zeroes each, compared to the definition in (17), and, $$V_{a_9} = \begin{bmatrix} -\frac{63}{128}(A_1^8 + 20A_2^2 A_1^6 + 60A_2^4 A_1^4 + 40A_2^6 A_1^2 + 5A_2^8) \\ -\frac{63}{128}(A_2^8 + 20A_1^2 A_2^6 + 60A_1^4 A_2^4 + 40A_1^6 A_2^2 + 5A_1^8) \\ -\frac{63}{128}(4A_2^2 A_1^6 + 30A_2^4 A_1^4 + 40A_2^6 A_1^2 + 10A_2^8) \\ -\frac{63}{128}(4A_1^2 A_2^6 + 30A_1^4 A_2^4 + 40A_1^6 A_2^2 + 10A_1^8) \\ -\frac{63}{128}(6A_2^4 A_1^4 + 20A_2^6 A_1^2 + 10A_2^8) \\ -\frac{63}{128}(6A_1^4 A_2^4 + 20A_1^6 A_2^2 + 10A_1^8) \\ -\frac{63}{128}(4A_2^6 A_1^2 + 5A_2^8) \\ -\frac{63}{128}(4A_1^6 A_2^2 + 5A_1^8) \\ -\frac{63}{128}A_2^8 \\ -\frac{63}{128}A_1^8 \end{bmatrix}$$

By solving the system matrix equation in (21) for the odd gain coefficients $\alpha_1$-$\alpha_9$, and setting the even gain coefficients to zero, the $9^{th}$-order complex system model may be evaluated and ready for use in linearization.

Complex Model-Based Linearization

The linearization process may then be performed, or take place based on the extracted complex high-order model described above. The analysis used as part of the procedure is derived for third-order models and higher, including ninth-order models. Standard predistortion is analyzed and its higher-order secondary effects are considered and accounted for. Unlike the model extraction step where the terminology does not differ whether the signal chain under test is a TX or an RX signal chain, the linearization step terminology calls for the term predistortion when addressing TX signal chain linearization, and the complement term post-distortion when addressing RX signal chains. The analysis presented below is applicable to and is useful in either case, whether linearization is targeting a TX signal chain (or a VSG) or an RX signal chain (or a VSA). However, when applying the various embodiments of the characterization and linearization methodology described herein to either a TX signal chain or a RX signal chain, TX terminology is used throughout, except where clarification about the RX scenario is necessary.

Linearization for $3^{rd}$-Order Complex Models

Considering the general modulated carrier signal expressed in (4) with its defined I and Q components, and using it as the input X to the system whose transfer function is presented in (1), the resulting $Y_3$ signal is expressed in (22).

$$Y_3 = \alpha_1 A \cos(\omega_c t + \varphi) - \alpha_2 A^2 \cos^2(\omega_c t + \varphi) - \alpha_3 A^3 \cos^3(\omega_c t + \varphi) \quad (22)$$

Expanding $Y_3$ as described in (22) and considering only the passband components results in $Y_{3PB}$ as shown in (23).

$$Y_{3PB} = I_3 \cos(\omega_c t) - Q_3 \sin(\omega_c t) \quad (23)$$

Where: $\begin{cases} I_3 = \left(\alpha_1 A - \frac{3}{4}\alpha_3 A^3\right) \cos(\varphi) \\ Q_3 = \left(\alpha_1 A - \frac{3}{4}\alpha_3 A^3\right) \sin(\varphi) \end{cases}$ Thus, the corresponding baseband complex signal $Z_{Y_{3PB}}$ may be expressed as shown in (24), where it may be observed that the system's $3^{rd}$-order nonlinearity does not directly affect the complex (IQ) signal phase $\varphi$. This is expected from the memory-less model used in the analysis. The nonlinearity, however, directly affects the signal magnitude or envelop by multiplying it by the linear gain $\alpha_1$ and adding a cubed portion of it multiplied by $-\frac{3}{4}$ and the $3^{rd}$-order gain, as shown in (24).

$$Z_{Y_{3PB}} = (\alpha_1 A - \frac{3}{4}\alpha_3 A^3) e^{j\varphi} \quad (24)$$

While the nonlinearity does not directly affect the complex signal phase $\varphi$, it does affect it indirectly through the potential phase difference between $\alpha_1$ and $\alpha_3$. Because the linear and the $3^{rd}$-order gains are not necessarily in-phase, in general, the term $(\alpha_1 A - \frac{3}{4}\alpha_3 A^3)$ may be expressed as a complex number, whose phase then gets factored into $\varphi$. This is a manifestation of AM-PM conversion, where the phase of the signal gets modulated by the signal amplitude due to a phase difference between the linear and non-linear gain coefficients. Standard predistortion procedure operates on the input signal generally expressed in (4) and strategically adds nonlinear components to it, based on the output seen in (24), such that when the predistorted input goes through the system, the nonlinear components cancel to first order. Below is a summary of how a $3^{rd}$-order nonlinearity in a system relates the general input and output of the system.

$$\begin{cases} \text{Input:} \quad Z_X = A e^{j\varphi} \\ \text{Output:} \quad Z_{Y_{3PB}} = \left(\alpha_1 A - \frac{3}{4}\alpha_3 A^3\right) e^{j\varphi} \end{cases} \quad (25)$$

The third-order predistortion procedure thus calls for providing the system with a signal whose envelop is expressed in (26). The "'" in the '$A'_3$' is used to indicate predistortion (of the envelop) and the '3' in the subscript indicates the (third-) order of the predistortion.

$$A'_3 = \left(A + \frac{3\alpha_3}{4\alpha_1} A^3\right) \quad (26)$$

The envelop of the input signal contains a $3^{rd}$-order component that is equal to the one that is normally generated by $3^{rd}$-order nonlinearity, but of opposite phase and divided by the complex linear gain of the system. This ensures that after the input passes through the system linear gain, the newly added term cancels out with the system-generated $3^{rd}$-order term. However, the process generates new higher-order, but generally less significant, terms as can be seen in (27). Here too, the "'" in $Z_{Y'_{3PB}}$ indicates that the passband output of the $3^{rd}$-order system corresponds to a predistorted input $Z_{X'_3}$.

$$Z_{Y'_{3PB}} = \left(\alpha_1 A'_3 - \frac{3}{4}\alpha_3 A'^3_3\right) e^{j\varphi} = \left(\alpha_1\left(A + \frac{3\alpha_3}{4\alpha_1} A^3\right) - \frac{3}{4}\alpha_3\left(A + \frac{3\alpha_3}{4\alpha_1} A^3\right)^3\right) e^{j\varphi}$$
$$= \left(\alpha_1 A - \frac{3^3}{4^2}\frac{\alpha_3^2}{\alpha_1} A^5 - \frac{3^4}{4^3}\frac{\alpha_3^3}{\alpha_1^2} A^7 - \frac{3^4}{4^4}\frac{\alpha_3^4}{\alpha_1^3} A^9\right) e^{j\varphi} \quad (27)$$

From the system's output complex signal resulting from the predistorted input, it may be deduced that an enhanced input signal may result in the generated secondary higher-order terms being cancelled out, to first order. The enhanced input signal's envelop would include in addition to the terms presented in (26), the secondary higher-order terms shown in (27), but with opposite phase and divided by the system's complex linear gain $\alpha_1$. Finally, the linearizing input signal envelop based on $3^{rd}$-order model extraction that compensates for secondary effects of predistortion is presented in (28), where '"' indicates predistortion that takes into account secondary effects.

$$A_3'' = A + \frac{3\alpha_3}{4\alpha_1}A^3 + \frac{3^3\alpha_3^2}{4^2\alpha_1^2}A^5 + \frac{3^4\alpha_3^3}{4^3\alpha_1^3}A^7 + \frac{3^4\alpha_3^4}{4^4\alpha_1^4}A^9 \quad (28)$$

Linearization for $5^{th}$-Order Complex Models

Using a similar flow as presented above, the general modulated carrier signal presented in (4) may be used as an input to the system whose transfer function is presented in (10), with the resulting signal is shown in (29).

$$Y_5 = \alpha_1 A \cos(\omega_c t + \varphi) - \alpha_2 A^2 \cos^2(\omega_c t + \varphi) - \alpha_3 A^3 \cos^3(\omega_c t + \varphi) - \alpha_4 A^4 \cos^4(\omega_c t + \varphi) - \alpha_5 A^5 \cos^5(\omega_c t + \varphi) \quad (29)$$

Expanding $Y_5$ and considering only the passband components results in $Y_{5PB}$, as shown in (30).

$$Y_{5PB} = I_5 \cos(\omega_c t) - Q_5 \sin(\omega_c t) \quad (30)$$

Where:
$$\begin{cases} I_5 = \left(\alpha_1 A - \frac{3}{4}\alpha_3 A^3 - \frac{10}{16}\alpha_5 A^5\right)\cos(\varphi) \\ Q_5 = \left(\alpha_1 A - \frac{3}{4}\alpha_3 A^3 - \frac{10}{16}\alpha_5 A^5\right)\sin(\varphi) \end{cases}$$

Whereas the complex baseband input is still $Z_X = Ae^{j\varphi}$, the baseband complex output becomes:

$$Z_{Y_{5PB}} = (\alpha_1 A - \tfrac{3}{4}\alpha_3 A^3 - \tfrac{10}{16}\alpha_5 A^5)e^{j\varphi} \quad (31)$$

As in the case of third-order systems, the complex baseband signal phase, $\varphi$, is not directly affected by the system distortion, but rather indirectly through AM-PM conversion due to $\alpha_1$, $\alpha_3$, and $\alpha_5$ having generally different phases relative to one another. The output signal envelop has a new $5^{th}$-order term, which the predistorted linearizing input signal needs to compensate for. Thus, the new predistorted input signal $Z_{X'_5} = A'_5 e^{j\varphi}$ has the envelop detailed in (32).

$$A'_5 = \left(A + \frac{3\alpha_3}{4\alpha_1}A^3 + \frac{10\alpha_5}{16\alpha_1}A^5\right) \quad (32)$$

The baseband complex output corresponding to the predistorted input is shown in (33). The higher order terms (H.O.T.) correspond to terms whose order is higher than 11. Such higher order terms were empirically found to be of negligible effect for the common signal range of RF vector signal transceiver and test systems considered for the embodiments described herein. It should be noted that the $3^{rd}$- and $5^{th}$-order terms shown in (31) cancel out, and thus no $3^{rd}$- and $5^{th}$-order terms exist in the complex baseband output corresponding to the predistorted input shown in (33).

$$Z_{Y'_{5PB}} = \left(\alpha_1 A'_5 - \frac{3}{4}\alpha_3 A'^3_5 - \frac{10}{16}\alpha_5 A'^5_5\right)e^{j\varphi} = \quad (33)$$

-continued
$$\cdots = \left(\alpha_1 A - \frac{27\alpha_3^2}{16\alpha_1}A^5 - \frac{45\alpha_3\alpha_5}{32\alpha_1}A^7 - \frac{81\alpha_3^3}{64\alpha_1^2}A^7 - \right.$$
$$\frac{135\alpha_3^2\alpha_5}{64\alpha_1^2}A^9 - \frac{81\alpha_3^4}{256\alpha_1^3}A^9 - \frac{225\alpha_3\alpha_5^2}{256\alpha_1^2}A^{11} -$$
$$\frac{405\alpha_3^3\alpha_5}{512\alpha_1^3}A^{11} - \frac{75\alpha_3\alpha_5}{32\alpha_1}A^7 - \frac{125\alpha_5^2}{64\alpha_1}A^9 - \frac{225\alpha_3^2\alpha_5}{64\alpha_1^2}A^9 -$$
$$\left. \frac{375\alpha_3\alpha_5^2}{64\alpha_1^2}A^{11} - \frac{675\alpha_3^3\alpha_5}{256\alpha_1^3}A^{11} - H.O.T.\right)e^{j\varphi}$$

The enhanced input signal that accounts for the secondary effects shown in (33) is expressed as $Z_{X''_5} = A''_5 e^{j\varphi}$, where the envelop $A''_5$ is expressed in (34). The terms of order 13 and higher are not considered in the $A''_5$ expression shown in (34).

$$A''_5 = A + \frac{3\alpha_3}{4\alpha_1}A^3 + \frac{10\alpha_5}{16\alpha_1}A^5 + \frac{27\alpha_3^2}{16\alpha_1^2}A^5 + \quad (34)$$
$$\frac{45\alpha_3\alpha_5}{32\alpha_1^2}A^7 + \frac{81\alpha_3^3}{64\alpha_1^3}A^7 + \frac{135\alpha_3^2\alpha_5}{64\alpha_1^3}A^9 + \frac{81\alpha_3^4}{256\alpha_1^4}A^9 +$$
$$\frac{225\alpha_3\alpha_5^2}{256\alpha_1^3}A^{11} + \frac{405\alpha_3^3\alpha_5}{512\alpha_1^4}A^{11} + \frac{75\alpha_3\alpha_5}{32\alpha_1^2}A^7 +$$
$$\frac{125\alpha_5^2}{64\alpha_1^2}A^9 + \frac{225\alpha_3^2\alpha_5}{64\alpha_1^3}A^9 + \frac{375\alpha_3\alpha_5^2}{64\alpha_1^3}A^{11} + \frac{675\alpha_3^3\alpha_5}{256\alpha_1^4}A^{11}$$

Linearization for $7^{th}$-Order Complex Models

Continuing the analysis from above, the general modulated carrier signal shown in (4) may be used as an input to the $7^{th}$-order system whose transfer function is presented in (14), with the resulting signal shown in (35).

$$Y_7 = \alpha_1 A \cos(\omega_c t + \varphi) - \alpha_2 A^2 \cos^2(\omega_c t + \varphi) - \quad (35)$$
$$\alpha_3 A^3 \cos^3(\omega_c t + \varphi) - \alpha_4 A^4 \cos^4(\omega_c t + \varphi) -$$
$$\alpha_5 A^5 \cos^5(\omega_c t + \varphi) - \alpha_6 A^6 \cos^6(\omega_c t + \varphi) - \alpha_7 A^7 \cos^7(\omega_c t + \varphi)$$

Expanding $Y_7$ and considering only the passband components results in $Y_{7PB}$, as shown in (36).

$$Y_{7PB} = I_7 \cos(\omega_c t) - Q_7 \sin(\omega_c t) \quad (36)$$

Where:
$$\begin{cases} I_7 = \left(\alpha_1 A - \frac{3}{4}\alpha_3 A^3 - \frac{10}{16}\alpha_5 A^5 - \frac{35}{64}\alpha_7 A^7\right)\cos(\varphi) \\ Q_7 = \left(\alpha_1 A - \frac{3}{4}\alpha_3 A^3 - \frac{10}{16}\alpha_5 A^5 - \frac{35}{64}\alpha_7 A^7\right)\sin(\varphi) \end{cases}$$

Whereas the complex baseband input is still $Z_X = Ae^{j\varphi}$, the baseband complex output becomes:

$$Z_{Y_{7PB}} = (\alpha_1 A - \tfrac{3}{4}\alpha_3 A^3 - \tfrac{10}{16}\alpha_5 A^5 - \tfrac{35}{64}\alpha_7 A^7)e^{j\varphi} \quad (37)$$

The envelop of the predistorted input $Z_{X'_7} = A'_7 e^{j\varphi}$, which nulls out the nonlinear terms shown in (37) is expressed in (38). This follows the same analysis as before with lower order predistortion, where the nonlinear terms are added to the input with opposite phase and divided by the complex linear gain.

$$A'_7 = \left(A + \frac{3\alpha_3}{4\alpha_1}A^3 + \frac{10\alpha_5}{16\alpha_1}A^5 + \frac{35\alpha_7}{64\alpha_1}A^7\right) \quad (38)$$

The output corresponding to the predistorted input shown above in (38) is shown in (39). Again, the high order terms (H.O.T.) are still defined as those whose order is greater than 11 (i.e. 13 and greater).

$$Z_{Y'_{7PB}} = \left(\alpha_1 A'_7 - \frac{3}{4}\alpha_3 A'^3_7 - \frac{10}{16}\alpha_5 A'^5_7 - \frac{35}{64}\alpha_7 A'^7_7\right)e^{j\varphi} = \quad (39)$$

$$\ldots = \left(\alpha_1 A - \frac{27\alpha_3^2}{16\alpha_1}A^5 - \frac{45\alpha_3\alpha_5}{32\alpha_1}A^7 - \frac{81\alpha_3^3}{64\alpha_1^2}A^7 - \frac{315\alpha_3\alpha_7}{256\alpha_1}A^9 - \right.$$

$$\frac{135\alpha_3^2\alpha_5}{64\alpha_1^2}A^9 - \frac{81\alpha_3^4}{256\alpha_1^3}A^9 - \frac{945\alpha_3^2\alpha_7}{512\alpha_1^2}A^{11} -$$

$$\frac{225\alpha_3\alpha_5^2}{256\alpha_1^2}A^{11} - \frac{405\alpha_3^3\alpha_5}{512\alpha_1^3}A^{11} - \frac{75\alpha_3\alpha_5}{32\alpha_1}A^7 -$$

$$\frac{225\alpha_3^2\alpha_5}{64\alpha_1^2}A^9 - \frac{125\alpha_5^2}{64\alpha_1}A^9 - \frac{675\alpha_3^3\alpha_5}{256\alpha_1^3}A^{11} -$$

$$\frac{375\alpha_3\alpha_5^2}{64\alpha_1^2}A^{11} - \frac{875\alpha_5\alpha_7}{512\alpha_1}A^{11} - \frac{735\alpha_3\alpha_7}{256\alpha_1}A^9 -$$

$$\left. \frac{1225\alpha_5\alpha_7}{512\alpha_1}A^{11} - \frac{6615\alpha_3^2\alpha_7}{1024\alpha_1^2}A^{11} - H.O.T.\right)e^{j\varphi}$$

It should be noted that the nonlinear terms shown in (37) do not appear in (39), due to the predistortion nulling them out. However, many other secondary, higher order terms appear in the output. The enhanced predistorted input that accounts for these secondary terms is expressed as $Z_{X''_7}=A''_7 e^{j\varphi}$, where the enhanced signal envelop $A''_7$ is expressed in (40), excluding the terms whose order exceeds 11.

$$A''_7 = A + \frac{3\alpha_3}{4\alpha_1}A^3 + \frac{10\alpha_5}{16\alpha_1}A^5 + \frac{35\alpha_7}{64\alpha_1}A^7 + \frac{27\alpha_3^2}{16\alpha_1^2}A^5 + \frac{45\alpha_3\alpha_5}{32\alpha_1^2}A^7 + \quad (40)$$

$$\frac{81\alpha_3^3}{64\alpha_1^3}A^7 + \frac{315\alpha_3\alpha_7}{256\alpha_1^2}A^9 + \frac{135\alpha_3^2\alpha_5}{64\alpha_1^3}A^9 + \frac{81\alpha_3^4}{256\alpha_1^4}A^9 +$$

$$\frac{945\alpha_3^2\alpha_7}{512\alpha_1^3}A^{11} + \frac{225\alpha_3\alpha_5^2}{256\alpha_1^3}A^{11} + \frac{405\alpha_3^3\alpha_5}{512\alpha_1^4}A^{11} + \frac{75\alpha_3\alpha_5}{32\alpha_1^2}A^7 +$$

$$\frac{225\alpha_3^2\alpha_5}{64\alpha_1^3}A^9 + \frac{125\alpha_5^2}{64\alpha_1^2}A^9 + \frac{675\alpha_3^3\alpha_5}{256\alpha_1^4}A^{11} + \frac{375\alpha_3\alpha_5^2}{64\alpha_1^3}A^{11} +$$

$$\frac{875\alpha_5\alpha_7}{512\alpha_1^2}A^{11} + \frac{735\alpha_3\alpha_7}{256\alpha_1^2}A^9 + \frac{1225\alpha_5\alpha_7}{512\alpha_1^2}A^{11} + \frac{6615\alpha_3^2\alpha_7}{1024\alpha_1^3}A^{11}$$

Linearization for $9^{th}$-Order Complex Models

Using the same methodology and workflow as described above, a general modulated carrier signal such as the one shown in (4) may be used as input to the $9^{th}$-order system whose transfer function is presented in (18), with the resulting signal shown in (41).

$$Y_9 = \alpha_1 A\cos(\omega_c t + \varphi) - \alpha_2 A^2\cos^2(\omega_c t + \varphi) - \alpha_3 A^3\cos^3(\omega_c t + \varphi) - \quad (41)$$

$$\alpha_4 A^4\cos^4(\omega_c t + \varphi) - \alpha_5 A^5\cos^5(\omega_c t + \varphi) - \alpha_6 A^6\cos^6(\omega_c t + \varphi) -$$

$$\alpha_7 A^7\cos^7(\omega_c t + \varphi) - \alpha_8 A^8\cos^8(\omega_c t + \varphi) - \alpha_9 A^9\cos^9(\omega_c t + \varphi)$$

Expanding $Y_9$ and considering only the passband components results in $Y_{9PB}$, which is expressed in (42).

$$Y_{9PB} = I_9\cos(\omega_c t) - Q_9\sin(\omega_c t) \quad (42)$$

Where:

$$\begin{cases} I_9 = \left(\alpha_1 A - \frac{3}{4}\alpha_3 A^3 - \frac{10}{16}\alpha_5 A^5 - \frac{35}{64}\alpha_7 A^7 - \frac{63}{128}\alpha_9 A^9\right)\cos(\varphi) \\ Q_9 = \left(\alpha_1 A - \frac{3}{4}\alpha_3 A^3 - \frac{10}{16}\alpha_5 A^5 - \frac{35}{64}\alpha_7 A^7 - \frac{63}{128}\alpha_9 A^9\right)\sin(\varphi) \end{cases}$$

Whereas the complex baseband input is still $Z_X = Ae^{j\varphi}$, the baseband complex output becomes:

$$Z_{Y_{9PB}} = (\alpha_1 A - 3/4\alpha_3 A^3 - 10/16\alpha_5 A^5 - 35/64\alpha_7 A^7 - 63/128\alpha_9 A^9)e^{j\varphi} \quad (43)$$

The envelop of the predistorted input $Z_{X'_9} = A'_9 e^{j\varphi}$, which nulls out the nonlinear terms shown in (43) is expressed in (44). This follows the same analysis as previously performed with lower order predistortion, where the nonlinear terms are added to the input with opposite phase and divided by the complex linear gain.

$$A'_9 = \left(A + \frac{3\alpha_3}{4\alpha_1}A^3 + \frac{10\alpha_5}{16\alpha_1}A^5 + \frac{35\alpha_7}{64\alpha_1}A^7 + \frac{63\alpha_9}{128\alpha_1}A_9\right) \quad (44)$$

The output corresponding to the predistorted input shown above in (44) is shown in (45).

$$Z_{Y'_{9PB}} = \left(\alpha_1 A'_9 - \frac{3}{4}\alpha_3 A'^3_9 - \frac{10}{16}\alpha_5 A'^5_9 - \frac{35}{64}\alpha_7 A'^7_9 - \frac{63}{128}\alpha_9 A'^9_9\right)e^{j\varphi} = \quad (45)$$

$$\ldots = \left(\alpha_1 A - \frac{27\alpha_3^2}{16\alpha_1}A^5 - \frac{45\alpha_3\alpha_5}{32\alpha_1}A^7 - \frac{81\alpha_3^3}{64\alpha_1^2}A^7 - \frac{315\alpha_3\alpha_7}{256\alpha_1}A^9 - \right.$$

$$\frac{135\alpha_3^2\alpha_5}{64\alpha_1^2}A^9 - \frac{81\alpha_3^4}{256\alpha_1^3}A^9 - \frac{567\alpha_3\alpha_9}{512\alpha_1}A^{11} - \frac{225\alpha_3\alpha_5^2}{256\alpha_1^2}A^{11} -$$

$$\frac{945\alpha_3^2\alpha_7}{512\alpha_1^2}A^{11} - \frac{405\alpha_3^3\alpha_5}{512\alpha_1^3}A^{11} - \frac{75\alpha_3\alpha_5}{32\alpha_1}A^7 -$$

$$\frac{225\alpha_3^2\alpha_5}{64\alpha_1^2}A^9 - \frac{125\alpha_5^2}{64\alpha_1}A^9 - \frac{675\alpha_3^3\alpha_5}{256\alpha_1^3}A^{11} - \frac{375\alpha_3\alpha_5^2}{64\alpha_1^2}A^{11} -$$

$$\frac{875\alpha_5\alpha_7}{512\alpha_1}A^{11} - \frac{735\alpha_3\alpha_7}{256\alpha_1}A^9 - \frac{1225\alpha_5\alpha_7}{512\alpha_1}A^{11} -$$

$$\left. \frac{6615\alpha_3^2\alpha_7}{1024\alpha_1^2}A^{11} - \frac{1701\alpha_3\alpha_9}{512\alpha_1}A^{11} - H.O.T.\right)e^{j\varphi}$$

Similar to the case in Sections 0 and 0, the high order terms (H.O.T.) are defined as those whose order is greater than 11 (i.e. 13 and greater). It should be noted that the nonlinear terms shown in (43) do not appear in (45), due to the predistortion nulling them out. However, many other secondary, higher order terms appear in the output. The enhanced predistorted input that accounts for these secondary terms is expressed as $Z_{X''_9} = A''_9 e^{j\varphi}$, where the enhanced signal envelop $A''_9$ is expressed in (46), excluding the terms whose order exceeds 11.

$$A''_9 = A + \frac{3\alpha_3}{4\alpha_1}A^3 + \frac{10\alpha_5}{16\alpha_1}A^5 + \frac{35\alpha_7}{64\alpha_1}A^7 + \frac{63\alpha_9}{128\alpha_1}A^9 + \frac{27\alpha_3^2}{16\alpha_1^2}A^5 + \quad (46)$$

$$\frac{45\alpha_3\alpha_5}{32\alpha_1^2}A^7 + \frac{81\alpha_3^3}{64\alpha_1^3}A^7 + \frac{315\alpha_3\alpha_7}{256\alpha_1^2}A^9 + \frac{135\alpha_3^2\alpha_5}{64\alpha_1^3}A^9 +$$

-continued $$\frac{81\alpha_3^4}{256\alpha_1^4}A^9 + \frac{567\alpha_3\alpha_9}{512\alpha_1^2}A^{11} + \frac{225\alpha_3\alpha_5^2}{256\alpha_1^3}A^{11} + \frac{945\alpha_3^2\alpha_7}{512\alpha_1^3}A^{11} +$$

$$\frac{405\alpha_3^3\alpha_5}{512\alpha_1^4}A^{11} + \frac{75\alpha_3\alpha_5}{32\alpha_1^2}A^7 + \frac{225\alpha_3^2\alpha_5}{64\alpha_1^3}A^9 + \frac{125\alpha_5^2}{64\alpha_1^2}A^9 +$$

$$\frac{675\alpha_3^3\alpha_5}{256\alpha_1^4}A^{11} + \frac{375\alpha_3\alpha_5^2}{64\alpha_1^3}A^{11} + \frac{875\alpha_5\alpha_7}{512\alpha_1^2}A^{11} + \frac{735\alpha_3\alpha_7}{256\alpha_1^2}A^9 +$$

$$\frac{1225\alpha_5\alpha_7}{512\alpha_1^2}A^{11} + \frac{6615\alpha_3^2\alpha_7}{1024\alpha_1^3}A^{11} + \frac{1701\alpha_3\alpha_9}{512\alpha_1^2}A^{11}$$

Efficacy of Linearization Through Complex Predistortion

Applying the predistortion scheme discussed herein to a system's input signal is based on knowledge and use of previously extracted values of the system model complex coefficients. The phase component of these complex coefficients directly relates to the phase of the tones measured during the characterization and model extraction. Consider the case where a TX signal chain (TX signal path) or a VSG is characterized with a cable (a generally perfectly linear device) attached to the RF output. A good linearization scheme is expected to be able to linearize a VSG with a cable attached to its output and for the VSG to still demonstrate maintained high linearity when the cable is removed, or vice versa. Nonetheless, adding or removing a cable from a signal chain does alter the measured tone phases during the characterization step. Thus, it is important for the linearization scheme to be immune to phase rotation of the measured tones (and consequently to the phase rotation of the coefficients) as long as the phase relationship among the tones (and among the coefficients) is maintained.

To demonstrate the immunity of the proposed embodiments discussed herein to phase rotation of tones and coefficients between the model extraction step and the linearization step, the simple case of $3^{rd}$-order linearization is considered. The analysis described below may be extended to higher order model extraction and linearization. In the analysis discussed above for $3^{rd}$-order model extraction and linearization, respectively, no concept of "measured" and "actual" coefficients was introduced. The coefficients found in the model extraction step were simply assumed to be the ones used during the linearization step. In reality, these two sets of coefficients may generally be phase rotated relative to one another. The coefficients that were once measured may not necessarily be in-phase with the actual coefficients during linearization.

Considering the $3^{rd}$-order coefficients found for a given system, per (9), the measured coefficients may be designated with subscript "m", for "measured". Thus, when used in (26) to predistort the system input, the resulting envelop may be expressed in (47), using the m-designated coefficients.

$$A_3' = \left(A + \frac{3\alpha_{3_m}}{4\alpha_{1_m}}A^3\right) \quad (47)$$

The system output signal expression resulting from the input being predistorted shown in (27) does not show the interaction between the "measured" and the "actual" coefficients, as it only shows the $3^{rd}$-order nonlinearity term $\frac{3}{4}\alpha_3 A^3$ absent (i.e. cancelled out). Below, the analysis shows the interaction and demonstrates how it leads to the nonlinear term getting cancelled. The coefficients designated with $\alpha$ are the "actual" coefficients during linearization.

$$Z_{Y_{3PB}'} = \left(\alpha_{1_a}A_3' - \frac{3}{4}\alpha_{3_a}A_3'^3\right)e^{j\varphi} \quad (48)$$

$$= \left[\alpha_{1_a}\left(A + \frac{3\alpha_{3_m}}{4\alpha_{1_m}}A^3\right) - \frac{3}{4}\alpha_{3_a}\left(A + \frac{3\alpha_{3_m}}{4\alpha_{1_m}}A^3\right)^3\right]e^{j\varphi}$$

$$= \left[\alpha_{1_a}A + \frac{3\alpha_{3_m}\alpha_{1_a}}{4\alpha_{1_m}}A^3 - \frac{3}{4}\alpha_{3_a}A^3 - H.O.T.\right]e^{j\varphi}$$

The two terms not shown in (27), but which are the focus here are the terms $$\frac{3\alpha_{3_m}\alpha_{1_a}}{4\alpha_{1_m}}A^3$$

and $-\frac{3}{4}\alpha_{3_a}A^3$. Whether these two terms would cancel as implicitly indicated in (27) is the question. The question may be better formulated into the expression shown in (49), where, as observed in the final equivalence expression, the terms would cancel out if simply the ratio of measured $\alpha_3$ to measured $\alpha_1$ were equal to that of actual $\alpha_3$ to actual $\alpha_1$.

$$\frac{3\alpha_{3_m}\alpha_{1_a}}{4\alpha_{1_m}}A^3 \overset{?}{\Leftrightarrow} \frac{3}{4}\alpha_{3_a}A^3 \quad (49)$$

$$\xrightarrow{yields}$$

$$\frac{\alpha_{3_m}\alpha_{1_a}}{\alpha_{1_m}} \overset{?}{\Leftrightarrow} \alpha_{3_a}$$

$$\xrightarrow{yields}$$

$$\frac{\alpha_{3_m}}{\alpha_{1_m}} \overset{?}{\Leftrightarrow} \frac{\alpha_{3_a}}{\alpha_{1_a}}$$

Thus, in terms of phase, the phases of $\alpha_1$ and $\alpha_3$ do not have to be the same between measured and actual, and it is sufficient to maintain the phase difference between $\alpha_1$ and $\alpha_3$ between measured and actual. This result proves that the various embodiments discussed herein are immune to phase-rotation of the coefficients between the model extraction step and the linearization step, where the coefficients are used in predistortion.

Figure 6:
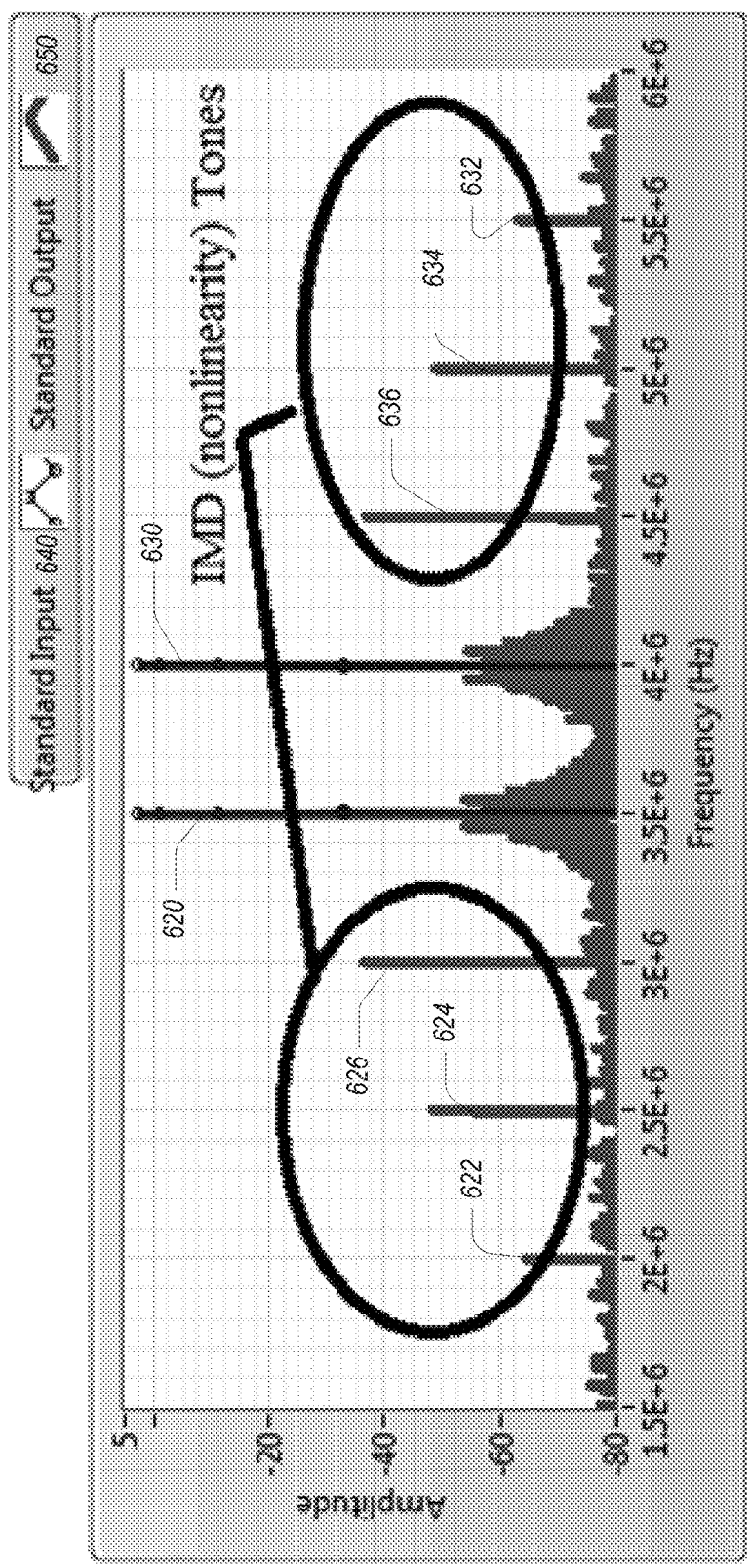
FIG. 6 shows a frequency vs. amplitude chart illustrating standard input and output baseband signals.

FIGS. 6-9 show diagrams illustrating various frequency and power measurements, highlighting sample measurement results performed on embodiments of transceiver systems, including dynamically extracted complex nonlinear models as disclosed herein. FIG. 6 shows a sample of the standard baseband signal, illustrating the input signal 640 (including input tones 620 and 630) provided to the DAC to be generated, (e.g. in the DAC shown in FIG. 5) and the output signal 650 (including output tones 622-626 and 632-636, as well as the two main output tones corresponding to and overlapping with input tones 620 and 630, respectively) received at the ADC (e.g. at the ADC shown in FIG. 5) after downconversion through the RX signal chain. It should be noted that the intent is to generate the two main tones (corresponding to and overlapping with input tones 620 and 630) only. However, other tones (622-626 and 632-636) are generated in addition to the two main tones that overlap with input tones 620 and 630.

Figure 7:
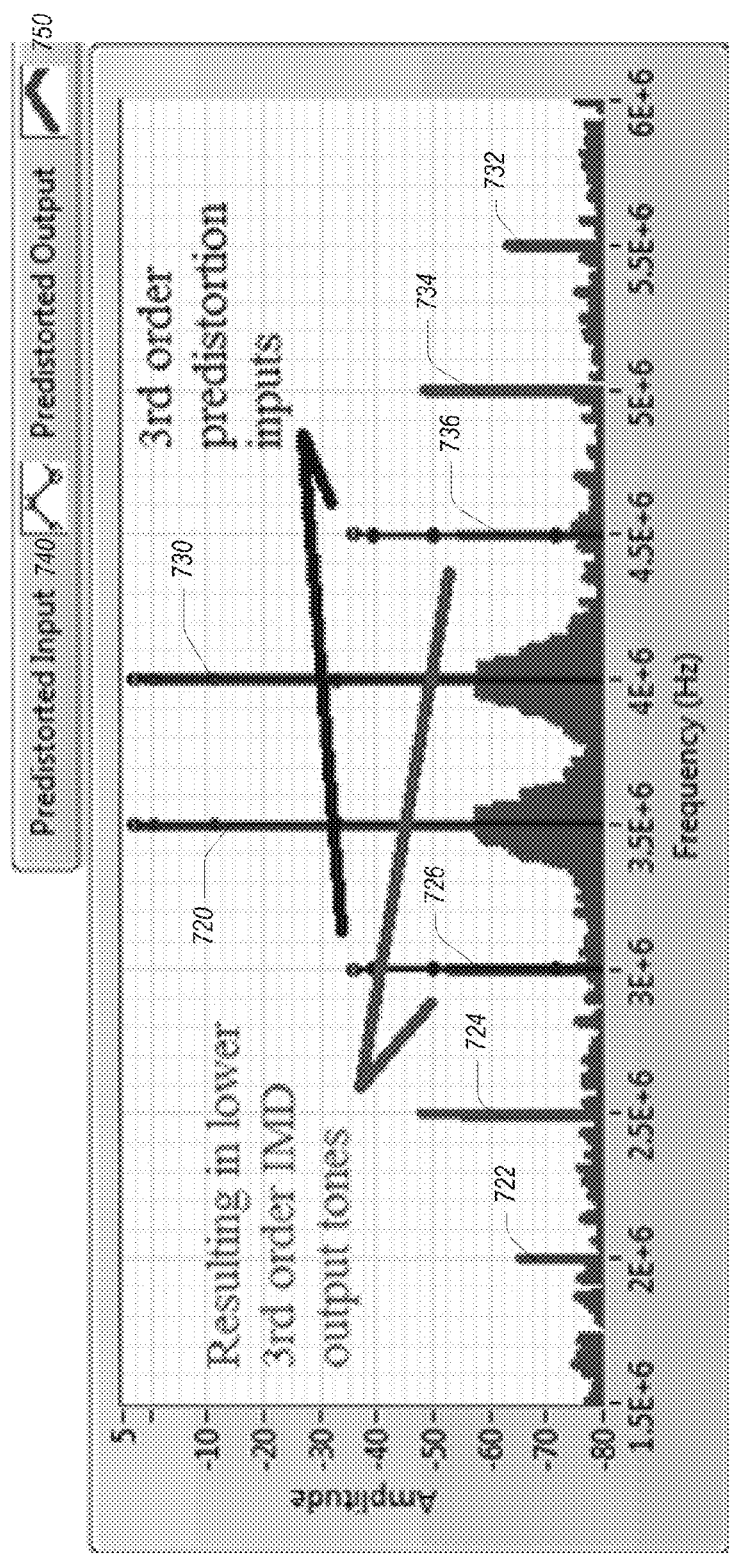
FIG. 7 shows a frequency vs. amplitude chart illustrating input and output baseband signals when $3^{rd}$ order predistortion is applied.

FIG. 7 shows a frequency vs. amplitude chart illustrating input and output baseband signals when $3^{rd}$ order predistortion is applied. As seen in FIG. 7, there are now four input tones (720, 730, 726, and 736) representative of predistorted input signal 740, and corresponding two main tones respectively overlapping with input tones 720 and 730, and two $3^{rd}$ order IMD output tones respectively overlapping with input tones 726 and 736. In comparison to FIG. 6, the $3^{rd}$ order output tones, (in this case also corresponding to $3^{rd}$ order input tones 726 and 736), shown in FIG. 7 decrease by around 20 dB after applying $3^{rd}$ order predistortion. The presence of predistortion is illustrated by the appearance of tones at the same frequency as the IMD tones, shown as 626 and 636, respectively, in the output signal 650 in FIG. 6. In other words, the appearance of $3^{rd}$ order input tones 726 and 736 in FIG. 7 illustrates the presence of predistortion, and as a result of that predistortion, the output tones at the frequencies corresponding to input tones 726 and 736, respectively, decrease by 20 dB when compared with output tones 626 and 636, respectively.

Figure 8:
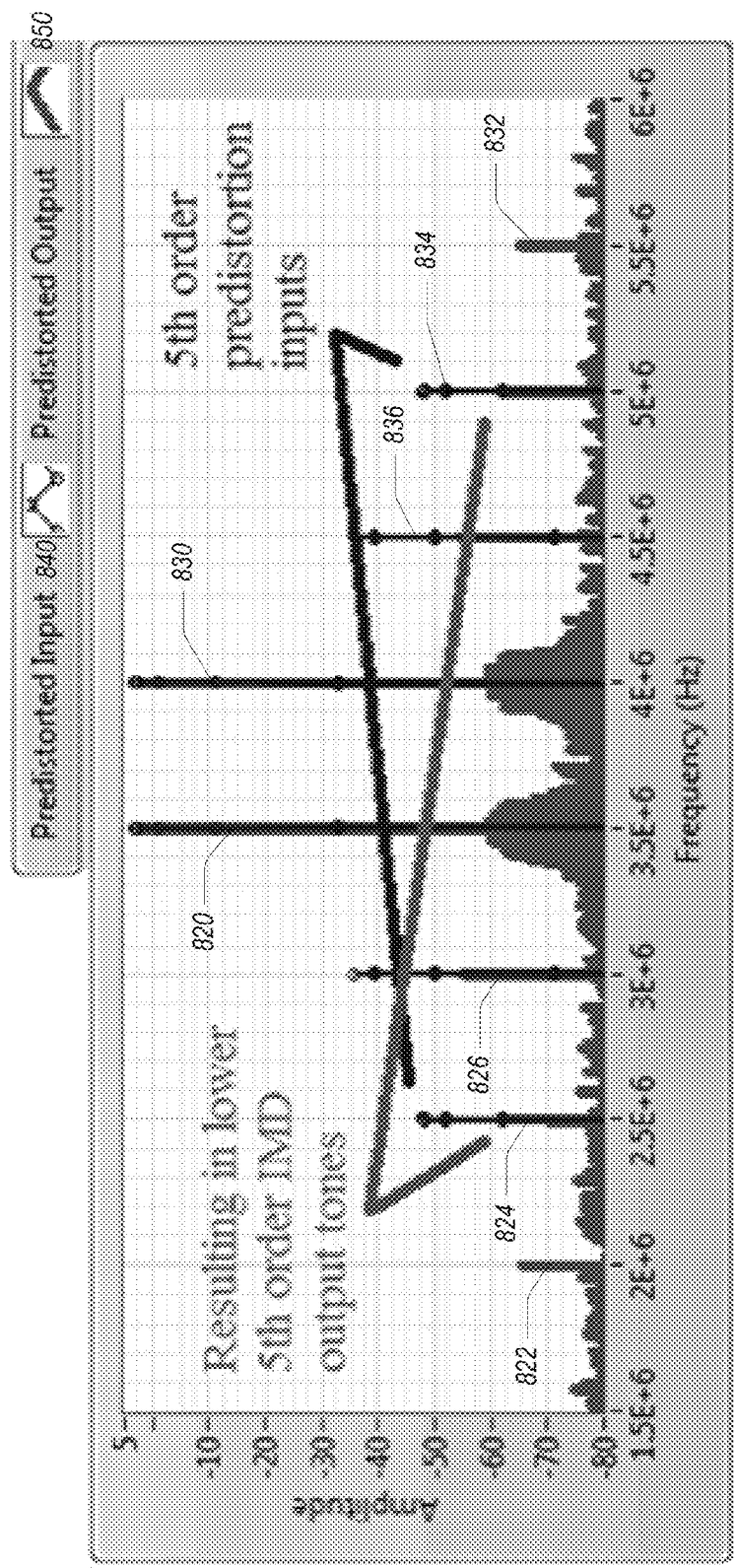
FIG. 8 shows a frequency vs. amplitude chart illustrating input and output baseband signals when $5^{th}$ order predistortion is applied.

Similarly, FIG. 8 shows what the input signal 840 and output baseband signals 850 look like with $5^{th}$ order predistortion applied. As seen in FIG. 8, there are now six input tones (820, 824, 826, 830, 834 and 836) representative of predistorted input signal 840, and corresponding two main tones respectively overlapping with input tones 820 and 830, two $3^{rd}$ order output tones respectively overlapping with $3^{rd}$ order input tones 826 and 836, and two $5^{th}$ order output tones respectively overlapping with $5^{th}$ order input tones 824 and 834. The presence of $5^{th}$ order predistortion is illustrated by the appearance of tones at the same frequency as the $5^{th}$ order IMD tones, shown as 624 and 634, respectively, in the output signal 650 in FIG. 6. In other words, the appearance of input tones 824 and 834 in FIG. 8 illustrates the presence of $5^{th}$ predistortion, and as a result of that predistortion, the output tones at the frequencies corresponding to input tones 824 and 834, respectively, decrease by 15 dB when compared with output tones 624 and 634, respectively. The output tones corresponding to $3^{rd}$ order input tones 826 and 836 are as also appearing in FIG. 7.

Figure 9:
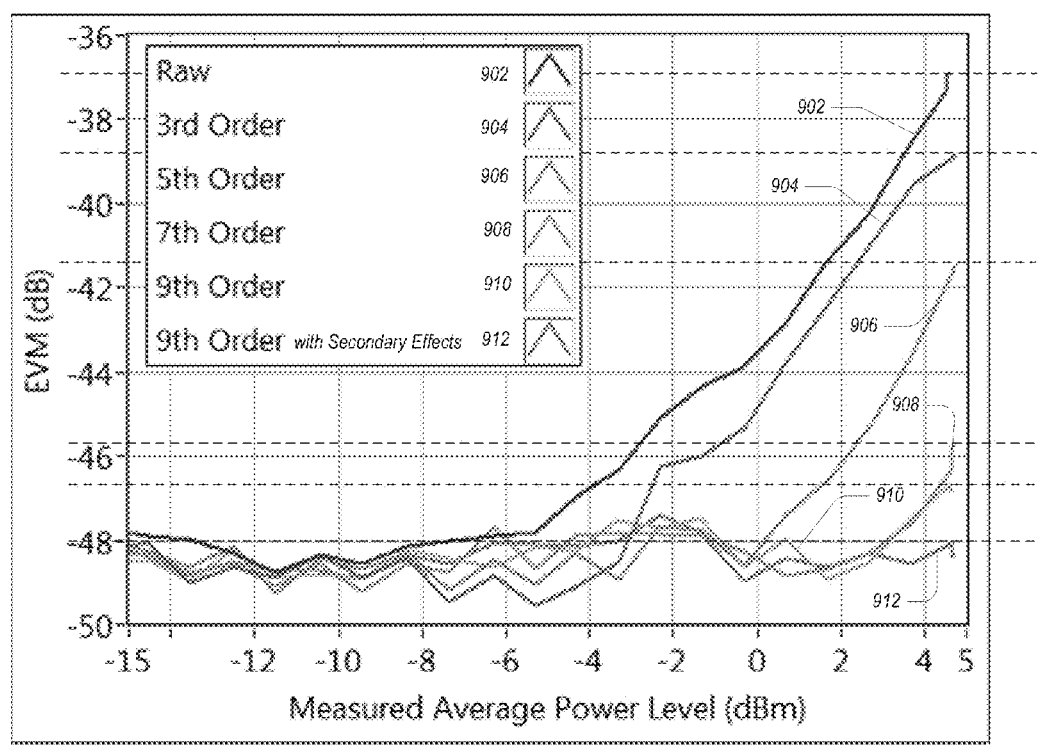
FIG. 9 shows a signal power diagram illustrating error vector measurements performed on a linearized TX portion of a vector signal transceiver, showing standard $3^{rd}$ order digital predistortion and $5^{th}$ order digital predistortion improvement effects.

FIG. 9 shows a sample of EVMs (error vector measurements) performed on a 802.11ac modulated signal. Lower EVM means better performance. The lower end of the graph's x-axis is where EVM is limited not by nonlinearity/distortion, but by noise. As the power generated (and measured) increases, the nonlinearity/distortion within the signal increases, leading to worse (i.e. higher) EVM. As can be seen from the graph shown in FIG. 9, the standard output 902 (without digital predistortion, i.e. without DPD) is the highest on the graph (i.e. worst). Third-order DPD improves the signal 904 up to 2 dB at ~5 dB average output power level, while fifth-order DPD improves the signal 906 another ~3 dB further (5 dB total from baseline) at 5 dBm average output power level. Similarly, seventh order DPP improves the signal 908 by an additional ~4 dB, and ninth order DPP improves the signal by another ~1 dB. These results provide examples of the results of the application of various embodiments of the methodology of model extraction and linearization performed as described herein.

Figure 10:
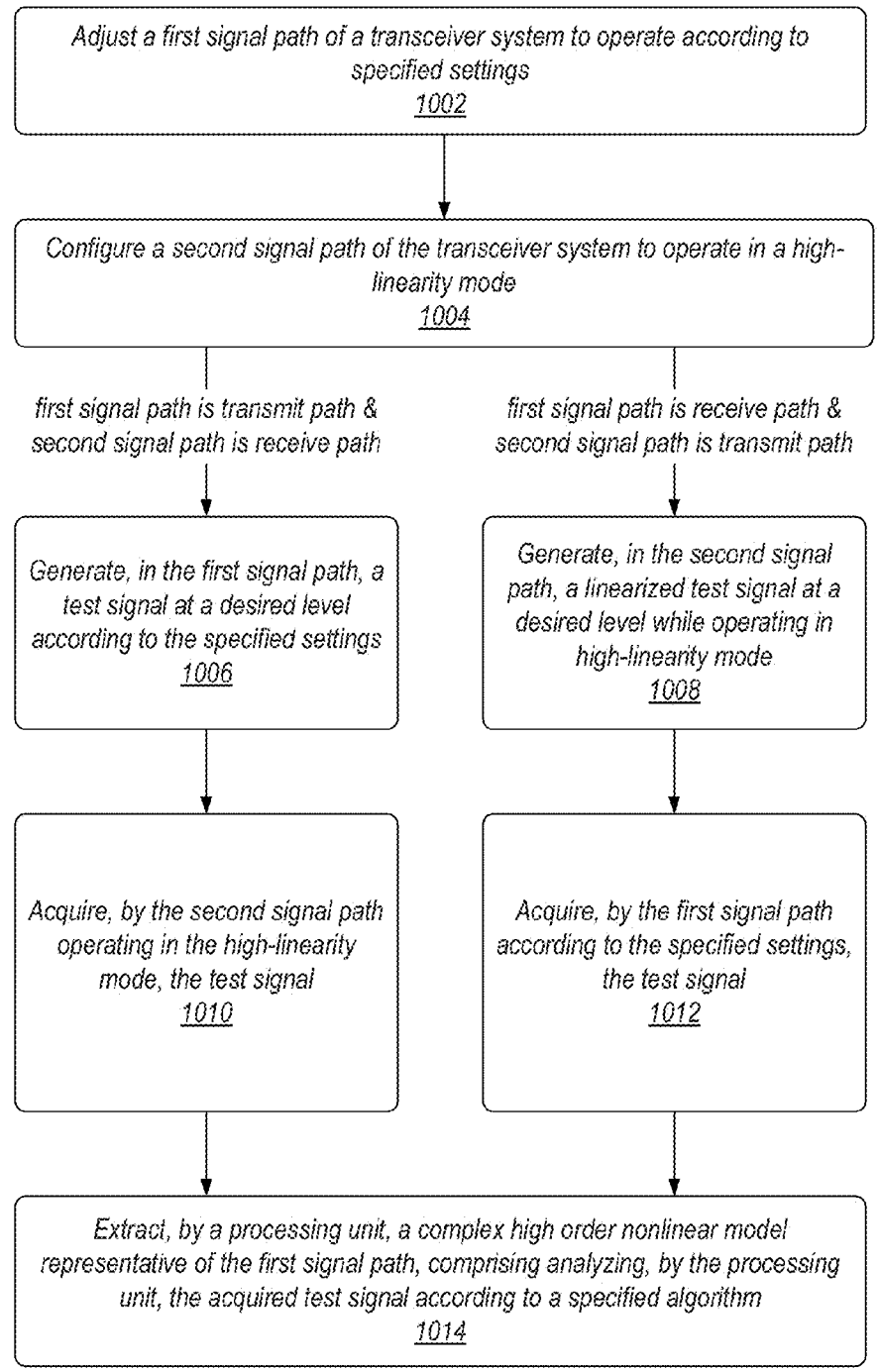
FIG. 10 shows a flow diagram of one embodiment of a method for performing extraction of a complex nonlinear model of a transmission path and/or receive path.

FIG. 10 shows a flow diagram of one embodiment of a method for performing extraction of a complex nonlinear model of a transmission/receive path in an RF transceiver system. As indicated in the flow diagram of FIG. 10, a first signal path of a transceiver system (such as an RF transceiver system) is adjusted to operate according to (a set of) specified settings (1004). As also indicated in the flow diagram in FIG. 10, a second signal path of the transceiver system is configured to operate in a high-linearity mode (1002). The first signal path is therefore the signal path for which the model is to be extracted, and the highly linearized second signal path is used (among other elements) to facilitate the extraction of that model.

In case the first signal path is a transmission or transmit path, it may be part of a signal generator, e.g. a vector signal generator, and may include various components used for generating an RF output signal. The various components may include a DAC, a mixer (e.g. quadrature mixer), various filters, etc. In such a case, the second signal path is a receiver or receive path, and it may be part of a signal analyzer, and may include various components used for receiving and processing an RF signal. The various components of the receive path may include a mixer (e.g. quadrature downmixer), an ADC, various filters, etc. When the first signal path is a transmit path and the second signal path is a receive path, a test signal may be generated in the first signal path at a desired level according to (at least) the specified settings (1006). The test signal may be generated based on a digital two-tone signal, which may be a digital baseband signal provided to the TX path with the intent to produce a two-tone output signal. The actual test (output) signal produced and output by the TX path may however include IMD tones of various orders due to various nonlinearities present in the TX path. The second signal path is then operated in the high-linearity mode, and is used to acquire the test signal (1010). Finally, a processing unit, e.g. a host computer or onboard processor or FPGA, or a combination thereof, is used to extract a complex high order nonlinear model representative of the first signal path, based on the acquired test signal and according to a specified algorithm (1014).

Alternatively, when the first signal path is a receive path and the second signal path is a transmit path, a linearized test signal (again, possibly based on a digital two-tone signal provided to the second signal path with the intent to produce a two-tone RF output signal) is generated in the second signal path at a desired level, while operating the second signal path in high-linearity mode (1008). The first signal path is then used to acquire, according to the specified settings, the test signal signal (1012). Finally, as in the previous case, a processing unit, e.g. a host computer or onboard processor or FPGA, or a combination thereof, is used to extract a complex high order nonlinear model representative of the first signal path, based on the acquired test signal and according to a specified algorithm (1014).

It is worth noting that, in general, when applying predistortion, the bandwidth of the baseband components (including DACs/ADCs) is required to be higher than the bandwidth of the original signal. Theoretically, the baseband bandwidth needs to be equal to the original signal bandwidth multiplied by the order of the highest order component used in predistortion, which can be as high as 11 if considering secondary effects up to $11^{th}$-order. However, as previously demonstrated, significant improvements may be gained in linearity performance when performing model extraction according to the embodiments disclosed herein, especially in systems with class A amplifiers, without having to meet this bandwidth requirement. Moreover, baseband bandwidth may also be saved by upsampling the signal (e.g. by interpolation) before applying predistortion, such that the new sampling rate corresponds to a bandwidth that accommodates the highest order predistortion component. Then, predistortion may be applied without concerns of the high-order predistortion components outside the original signal bandwidth aliasing into the original signal bandwidth. After predistortion is applied to the upsampled signal, the resulting signal may be filtered to exclude high-frequency components outside the baseband component capabilities. The signal may then be decimated back to the original sampling rate that is supported by the baseband components. The various embodiments discussed herein therefore facilitate the use of high-order signal predistortion for enhancing linearity within the signal bandwidth or active channel, and even possibly for including enhancements to the signal on each side of the channel to improve ACLR (Adjacent Channel Leakage Ratio) performance, without burdening the system with a significant increase in bandwidth requirement.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for obtaining a complex high-order nonlinear model of a signal path of a radio frequency (RF) system, the method comprising:
adjusting a first signal path of the RF system to operate according to specified settings;
configuring a second signal path of the RF system to operate in a high-linearity mode;
when the first signal path comprises a transmit signal chain and the second signal path comprises a receive signal chain:
generating, in the first signal path, a test signal at a desired level according to the specified settings, wherein the test signal is generated from a baseband signal having at least two tones; and
receiving, by the second signal path operating in the high-linearity mode, the generated test signal, and outputting an acquired test signal resulting from the generated test signal at an output of the second signal path;
when the first signal path comprises a receive signal chain and the second signal path comprises a transmit signal chain:
generating, in the second signal path operating in the high-linearity mode, the test signal at the desired level; and
receiving, by the first signal path operating according to the specified settings, the generated test signal, and outputting the acquired test signal at an output of the first signal path; and
extracting, by a processing unit, a complex high-order nonlinear memory-less model representative of the first signal path, wherein the extracting comprises analyzing, by the processing unit, the acquired test signal according to a specified algorithm that analytically identifies and isolates passband nonlinear components of the acquired test signal.

2. The method of claim 1, wherein the first signal path is a complement of the second signal path.

3. The method of claim 1, wherein the RF system is one of:
an RF transceiver; or
a test system.

4. The method of claim 1, further comprising:
when the first signal path comprises the transmit signal chain, linearizing the first signal path, comprising predistorting input signals according to the extracted complex high-order nonlinear memory-less model.

5. The method of claim 1, wherein when the first signal path comprises the transmit signal chain, the generated test signal comprises intermodulation distortion (IMD) components of one or more specified orders, caused by nonlinearity present in the first signal path.

6. A radio frequency (RF) transceiver system comprising:
a transmit path and a receive path each configurable to operate according to specified settings, and each configurable to operate in a high-linearity mode; and
a processing unit;
wherein when the transmit path is operating according to the specified settings and the receive path is operating in the high-linearity mode:
the transmit path is configured to generate a test signal at a desired level according to at least the specified settings, wherein the test signal is generated from a baseband signal having at least two tones; and
the receive path is configured to receive the generated test signal and output an acquired test signal resulting from the generated test signal at an output of the receive path;
wherein when the receive path is operating according to the specified settings and the transmit path is operating in the high-linearity mode:
the transmit path is configured to generate the test signal as a linearized test signal at the desired level; and
the receive path is configured to receive the generated test signal according to the specified settings and output the acquired test signal resulting from the generated test signal at the output of the receive path; and
wherein the processing unit is configured to:
receive the acquired test signal; and
extract a complex high-order nonlinear memory-less model representative of:
the transmit path, when the receive path is operating in the high-linearity mode; and
the receive path, when the transmit path is operating in the high-linearity mode:
wherein to extract the complex high-order nonlinear memory-less model, the processing unit is configured to analyze the acquired test signal according to a specified algorithm that analytically identifies and isolates passband nonlinear components of the acquired test signal.

7. The RF transceiver system of claim of claim 6, wherein the processing unit is configured to provide a two-tone baseband signal to the first signal path as the baseband signal.

8. The RF transceiver system of claim 6, further comprising:
predistortion circuitry configured to linearize the transmit path, wherein to linearize the transmit path, the predistortion circuitry is configured to predistort input signals according to the extracted complex high-order nonlinear memory-less model representative of the transmit path.

9. The RF transceiver system of claim 6, wherein when the transmit path generates the test signal at the desired level according to at least the specified settings, the generated test signal comprises intermodulation distortion (IMD) components of one or more specified orders, caused by nonlinearity present in the transmit path.

10. The RF transceiver system of claim 6, wherein the processing unit comprises one of:
a host computer;
a field programmable gate array; or
a combination of a host computer and a field programmable gate array.

11. A radio frequency (RF) system comprising:
a signal generator and a signal analyzer;
wherein the signal generator is configured to:
- generate a test signal at a desired level according to at least a set of specified settings when the signal analyzer is operating in a high-linearity mode, wherein the test signal is generated based on a baseband signal having at least two tones; and
- generate the test signal as a linearized test signal at the desired level when the signal generator is configured to operate in the high-linearity mode;

wherein the signal analyzer is configured to:
- receive the generated test signal and output an acquired test signal resulting from the generated test signal at an output of the signal analyzer; and a processing unit configured to:
- extract a complex high-order nonlinear memory-less model representative of:
  - the signal generator, when the signal analyzer is operating in the high-linearity mode; and
  - the signal analyzer, when the signal generator is operating in the high-linearity mode;
- wherein to extract the complex high-order nonlinear memory-less model, the signal generator is configured to analyze the acquired test signal according to a specified algorithm that analytically identifies and isolates passband nonlinear components of the acquired test signal.

12. The RF system of claim 11, wherein the signal generator comprises an RF signal transmit path and the signal analyzer comprises an RF signal receive signal path.

13. The RF transceiver system of claim of claim 12, wherein the RF signal transmit path comprises:
- a digital to analog converter configured to receive a two-tone baseband signal as the baseband signal, and generate and analog version of the two-tone baseband signal; and
- a transmit mixer circuit configured to generate the test signal based on the analog version of the two-tone baseband signal.

14. The RF system of claim of claim 11, wherein the processing unit is configured to provide the baseband signal to the signal generator.

15. The RF system of claim 11, further comprising:
predistortion circuitry configured to predistort input signals according to the extracted complex high-order nonlinear memory-less model of the signal generator;
wherein the signal generator is configured to generate output signals according to the predistorted signals.

16. The RF system of claim 11, wherein when the signal generator generates the test signal at the desired level according to at least the set of specified settings, the generated test signal comprises intermodulation distortion (IMD) components of one or more specified orders, caused by nonlinearity present in the signal generator.

17. The RF system of claim 11, wherein the processing unit comprises one of:
a host computer;
a field programmable gate array; or
a combination of a host computer and a field programmable gate array.

* * * * *

UNITED STATES PATENT AND TRADEMARK OFFICE
CERTIFICATE OF CORRECTION

PATENT NO. : 10,243,678 B2
APPLICATION NO. : 14/328898
DATED : March 26, 2019
INVENTOR(S) : Mohamad A. Zeidan, Christopher J. Behnke and Syed Jaffar Shah Page 1 of 1

It is certified that error appears in the above-identified patent and that said Letters Patent is hereby corrected as shown below:

In the Claims

Claim 6, Column 30, Line 37, please delete "in the high-linearity mode:" and substitute -- in the high-linearity mode; --.

Claim 7, Column 30, Line 44, please delete "The RF transceiver system of claim of claim 6, wherein" and substitute -- The RF transceiver system of claim 6, wherein --.

Claim 7, Column 30, Line 46, please delete "baseband signal to the first signal path as the baseband" and substitute -- baseband signal as the baseband --.

Claim 13, Column 32, Line 1, please delete "The RF transceiver system of claim of claim 12" and substitute -- The RF transceiver system of claim 12 --.

Claim 14, Column 32, Line 10, please delete "The RF system of claim of claim 11, wherein the" and substitute -- The RF system of claim 11, wherein the --.

Signed and Sealed this
Seventh Day of May, 2019

Andrei Iancu
*Director of the United States Patent and Trademark Office*